(12) United States Patent
Choi et al.

(10) Patent No.: US 8,194,558 B2
(45) Date of Patent: Jun. 5, 2012

(54) METHOD OF ESTIMATING SIGNAL-TO-NOISE RATIO, METHOD OF ADJUSTING FEEDBACK INFORMATION TRANSMISSION, ADAPTIVE MODULATION AND CODING METHOD USING THE SAME, AND TRANSCEIVER THEREOF

(75) Inventors: Jinsoo Choi, Anyang-Si (KR); Min Seok Oh, Anyang-Si (KR); Ki Hyoung Cho, Anyang-Si (KR); Seung Hyun Kang, Anyang-Si (KR); Sung Ho Moon, Anyang-Si (KR); Jae Hoon Chung, Anyang-Si (KR); Hyung Ho Park, Anyang-Si (KR); Doo Hyun Sung, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 12/376,754

(22) PCT Filed: Aug. 9, 2007

(86) PCT No.: PCT/KR2007/003828
§ 371 (c)(1),
(2), (4) Date: Jun. 15, 2010

(87) PCT Pub. No.: WO2008/018761
PCT Pub. Date: Feb. 14, 2008

(65) Prior Publication Data
US 2010/0309793 A1     Dec. 9, 2010

(30) Foreign Application Priority Data

Aug. 9, 2006 (KR) .................. 10-2006-0075035
Nov. 24, 2006 (KR) .................. 10-2006-0117045

(51) Int. Cl.
*H04L 12/26* (2006.01)
(52) U.S. Cl. .......... 370/252; 370/329; 370/468; 455/69; 455/452.2
(58) Field of Classification Search .................. 370/252, 370/253, 328–334, 338, 465, 468; 455/68, 455/69, 422.1, 434, 450–453, 509, 522
See application file for complete search history.

(56) References Cited

U.S. PATENT DOCUMENTS
2003/0231706 A1   12/2003   Hwang
2007/0298728 A1*  12/2007   Imamura et al. ............... 455/77

FOREIGN PATENT DOCUMENTS
CA   2579712 A1   3/2006
EP   1 289 181 A1   3/2003
(Continued)

*Primary Examiner* — Pao Sinkantarakorn
(74) *Attorney, Agent, or Firm* — Birch, Stewart, Kolasch & Birch, LLP

(57) ABSTRACT

A method of estimating a signal-to-noise ratio by considering user mobility, a method of adjusting feedback information transmission, an adaptive modulation and coding method using the same, and a transceiver thereof are disclosed. The present invention includes measuring a first channel parameter and a second channel parameter using first and second symbols sequentially received, respectively, estimating a channel quality considering a time delay between measurements of the first and second channel parameters using the first and second channel parameters, and transmitting information for the estimated channel quality if a variation of the first and second channel parameters is equal to or greater than a prescribed threshold. Accordingly, the present invention reduces performance degradation and feedback overhead caused by a time delay in channel quality estimation.

24 Claims, 16 Drawing Sheets

FOREIGN PATENT DOCUMENTS

| | | |
|---|---|---|
| JP | 2006-303556 A | 11/2006 |
| JP | 2007-150862 A | 6/2007 |
| JP | 2007-151056 A | 6/2007 |
| WO | WO 2006/028204 * | 3/2006 |

* cited by examiner

METHOD OF ESTIMATING SIGNAL-TO-NOISE RATIO, METHOD OF ADJUSTING FEEDBACK INFORMATION TRANSMISSION, ADAPTIVE MODULATION AND CODING METHOD USING THE SAME, AND TRANSCEIVER THEREOF

TECHNICAL FIELD

The present invention relates to an adaptive modulation and coding method, and more particularly, to a method of estimating a signal-to-noise ratio by considering user mobility, a method of adjusting feedback information transmission, an adaptive modulation and coding method using the same, and a transceiver thereof.

BACKGROUND ART

Generally, one of contents included in the standard of the third generation wireless mobile communication system is adaptive modulation and coding (AMC) scheme. For this, 3GPP TR 25.848 V4.0.0 (2001-03) "3rd Generation Partnership Project; Physical layer aspects of UTRA High Speed Downlink Packet Access" (available on http://www.3gpp.org) can be referred to.

The AMC scheme is the scheme for dynamically changing modulation and coding scheme (MCS) according to a channel status. In generally, a receiver observes a channel status to select suitable MCS and then feeds back the selected MCS to a transmitter. According to the AMC scheme, a variation of channel quality due to multi-path fading or user's movement can be compensated for to some extent.

One of general criteria used in determining MCS is to estimate a channel quality. By estimating a channel quality, an optimal MCS enabling a data rate to be maximized under the restriction of a target QoS (quality of service) is selected. Generally, a signal-to-noise ratio (Hereinafter abbreviated SNR) is frequently used as a channel quality. For example of the SNR estimation, David R. Pauluzzi, Norman C. Beaulieu, A comparison of SNR estimation techniques for the AWGN channel, IEEE Trans. on Comm., vol. 48, no. 10, pp. 1681-1691, October 2000 can be referred to.

To raise efficiency of AMC scheme, an accurate estimation of channel quality and a stable feedback channel path are needed. So, the accurate estimation of the channel quality is necessary for the efficient AMC scheme.

In general, a time delay is present between channel information of a receiver and that of a transmitter. Yet, in a channel environment having relatively large user mobility, a channel path currently estimated by the receiver may differ from a channel path which will be transmitted by the transmitter due to the time delay. For instance, a user currently located in an open space may enter a crowded space between buildings.

So, to raise performance of the AMC scheme, a time delay of channel information needs to be compensated for in a channel environment having user mobility.

Meanwhile, schemes (AMC included) for enhancing system performance through feedback normally provide maximum performance in case of receiving feedback information including a channel status and a user's moving speed, and the like from a receiving end at every time the data is transmitted. Yet, if feedback information is transmitted on every transmission, a feedback channel is overloaded. In particular, it is unable to effectively distribute channel resources in a multiple access system.

To solve this problem, a scheme for performing feedback according to a preset cycle without considering a channel status has been proposed by a related art.

However, this scheme has to calculate and transmit feedback information with a predetermined cycle even if a channel or a user's moving speed is not considerably changed. So, unnecessary loads are given to a receiving end a feedback channel.

Moreover, even if a channel or user's moving speed is considerably changed, the related art scheme is unable to receive feedback information unless a prescribed cycle arrives. So, the previous feedback information should be used to cause system degradation.

So, a method of effectively reducing a feedback information size smaller than that of the related art by maintaining throughput of a transmitting end is requested.

DISCLOSURE OF THE INVENTION

Technical Solution

Accordingly, the present invention is directed to a method of estimating a signal-to-noise ratio by considering user mobility, a method of adjusting feedback information transmission, an adaptive modulation and coding method using the same, and a transceiver thereof that substantially obviate one or more of the problems due to limitations and disadvantages of the related art.

An object of the present invention is to provide a signal-to-noise ratio estimating method and an adaptive modulation and coding method using the same, by which a delay time of channel information due to user mobility is considered.

Another object of the present invention is to provide a method of estimating a signal-to-noise ratio by considering user mobility, a method of adjusting feedback information transmission, an adaptive modulation and coding method using the same, and transceiver and receiver thereof, by which feedback overhead is reduced with minimized influence on system performance in a manner of avoiding blind feedback transmission and executing the feedback transmission only if predetermined conditions are met.

Through the methods of the present invention, an enhanced adaptive modulation and coding method is provided in a manner of compensating for performance degradation that may be generated in an environment where user mobility exists.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an adaptive modulation and coding method, in which adaptive modulation and coding (AMC) is applied in a channel environment considering user mobility, according to the present invention includes measuring a first channel parameter and a second channel parameter using first and second symbols sequentially received, respectively, estimating a channel quality considering a time delay between measurements of the first and second channel parameters using the first and second channel parameters, and transmitting information for the estimated channel quality if a variation of channel parameter between the first and second channel parameters is equal to or greater than a prescribed threshold.

Preferably, the first and second channel parameters are averages of per subcarrier signal-to-noise ratios of the first and second symbols received via at least one or more subcarriers, respectively.

Preferably, the channel quality considering the time delay is estimated by considering channel perturbation variation.

Preferably, the adaptive modulation and coding method further includes adjusting the threshold according to the variation.

More preferably, the adjusting threshold is carried out in a manner of decrementing the threshold if the variation increases or incrementing the threshold if the variation decreases.

To further achieve these and other advantages and in accordance with the purpose of the present invention, a method of estimating a signal-to-noise ratio includes finding first channel information for subcarriers by receiving first signals carried by the subcarriers, finding second channel information for the subcarriers by receiving second signals carried by the subcarriers after finding the first channel information, and estimating the signal-to-noise ratio (SNR) of a channel by considering a time delay between the first and second channel informations using the first and second channel informations.

To further achieve these and other advantages and in accordance with the purpose of the present invention, an adaptive modulation and coding method, in which modulation and coding schemes are adaptively decided according to a channel quality, includes receiving a symbol, estimating the channel quality by considering a time delay of a channel for transmitting the symbol using channel information estimated via the symbol, and deciding modulation and coding schemes of the symbol via the estimated channel quality.

To further achieve these and other advantages and in accordance with the purpose of the present invention, a receiver includes a channel estimator finding channel information using symbols received via an antenna, a channel quality estimator estimating a channel quality by considering a time delay of a channel for transmitting the symbols using the channel information, and a controller deciding modulation and coding schemes according to the channel quality.

To further achieve these and other advantages and in accordance with the purpose of the present invention, an adaptive feedback information adjusting method, in which a feedback information amount is adaptively adjusted by a receiving end of a communication system, includes determining a channel parameter by measuring a channel status, calculating a channel parameter variation using the determined channel parameter and a previously determined channel parameter, and if the channel parameter variation is greater than a preset threshold, transmitting prescribed feedback information to a transmitting end.

Preferably, the adaptive feedback information adjusting method further includes adjusting the threshold by considering the channel parameter variation.

In this case, the channel parameter means a parameter including at least one channel status associated measurement value to represent a channel status quantitatively. In particular, the channel parameter includes either at least one of the channel status associated measurement values including a channel power, an SNR, an SINR and the like or a value generated from combining at least one ore more measurement values.

To further achieve these and other advantages and in accordance with the purpose of the present invention, a transceiver in a communication system, which adjusts a feedback information amount in the communication system, includes a measuring module determining a channel parameter by measuring a channel status, a comparing module calculating a channel parameter variation using the determined channel parameter and a previously determined channel parameter, the comparing module, if the channel parameter variation is greater than a preset threshold, transmitting a feedback transmission control signal, and a feedback module transmitting prescribed feedback information if the feedback transmission control signal is received.

Preferably, the comparing module adjusts the threshold by considering the calculated channel parameter variation.

Preferably, the transceiver further includes a feedback adjusting module adjusting a feedback information amount by changing the preset threshold into a specific threshold.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention compensates for a time delay of a channel due to user mobility, thereby enhancing performance of a system. And, the present invention reduces a difference between an actual channel quality and an estimated channel quality due to a time delay in a channel environment having user mobility. Hence, the present invention determines an optimal MCS level and prevents performance of AMC scheme from being degraded.

Secondly, the present invention performs feedback transmission only if predetermined conditions are met. So, the present invention saves a resource of a feedback channel while a data rate of a transmitting end almost remains intact. And, the present invention is able to change a feedback condition by considering user mobility, thereby implementing an optimal data rate from the transmitting end.

Therefore, the present invention provides an enhanced AMC scheme of which performance degradation caused by inaccuracy of channel quality information and unnecessary feedback transmission in an environment having user mobility can be prevented.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

First of all, the following technology is applicable to various communication systems. The communication system is widely deployed to provide various communication services including audio, packet data, etc.

This technology is usable for downlink and/or uplink. The downlink means the communication from a base station (hereinafter abbreviated BS) to a mobile station (hereinafter abbreviated MS) and the uplink means the communication from a mobile station (MS) to a base station (BS).

The base station indicates a fixed station for communication with the mobile station in general. And, the base station can be called such a terminology as a node-B, a BTS (base transceiver system), an access point, and the like.

The mobile station is fixed or mobile and can be called such a terminology as a user equipment (UE), a user terminal (UT), a subscriber station (SS), a wireless device, and the like.

The technology explained in the following description is applicable to various multi-carrier communication systems including an OFDM (orthogonal frequency division multiplexing) system and the like. In the OFDM, a total system bandwidth is partitioned into a plurality of subcarriers having orthogonality. In this case, the subcarrier can be called a sub-band, a tone or the like.

A transmitter/receiver explained in the following description can be a transceiver capable of performing both functions of transmission and reception. Yet, to clearly explain data transmission, one side responsible for transmission of data is named a transmitter and the other side responsible for reception of data is named a receiver. In downlink, a transmitter can be a part of a base station and a receiver can be a part of a mobile station.

Besides, a base station can include a plurality of receivers and a plurality of transmitters. And, a mobile station can include a plurality of receivers and a plurality of transmitters.

An enhanced adaptive modulation and coding scheme according to one embodiment of the present invention is explained as follows.

Figure 1:
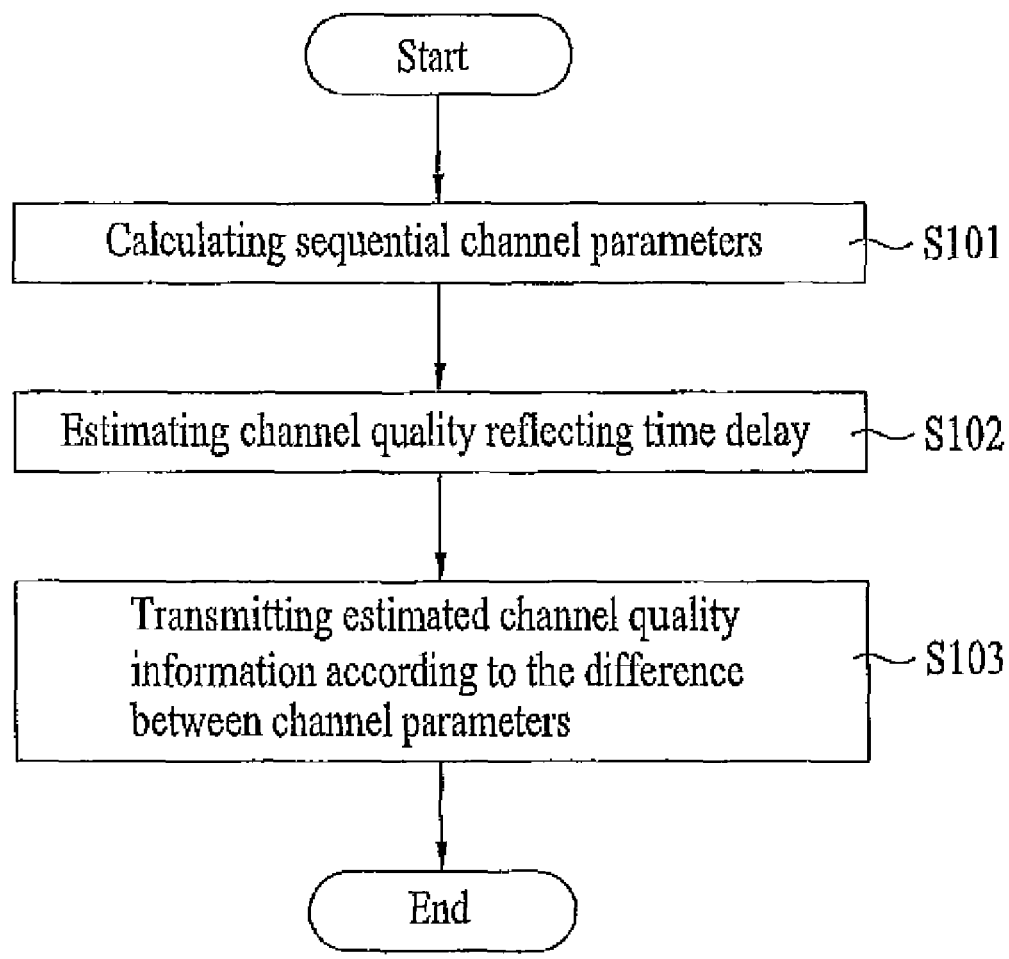
FIG. 1 is a flowchart of an enhanced adaptive modulation and coding scheme according to one embodiment of the present invention.

FIG. 1 is a flowchart of an enhanced adaptive modulation and coding scheme according to one embodiment of the present invention.

An enhanced modulation and coding (hereinafter called AMC) scheme according to this embodiment is provided to compensate for performance degradation of the related art AMC scheme in a channel environment that considers user mobility. For this, this embodiment mainly enhances the following two parts as follows.

First of all, a channel quality is estimated by considering a transmission time delay to prevent performance from being degraded by a time delay due to a transmission time of received symbols for channel quality information.

Secondly, the estimated channel quality information is not unconditionally transmitted by a preset period. Instead, channel quality information is fed back only if a channel variation exceeds a predetermined level. So, a feedback overhead can be reduced.

Referring to FIG. 1, in a step S101, sequential channel parameters are measured or calculated using sequentially received symbols. In this case, a channel parameter means a parameter that includes at least one channel status associated measurement value to represent a status of channel as quantitative. In particular, the channel parameter includes one of channel status associated measurement values such as SNR, SINR and the like or a value generated from combining at least one or more measurement values like above.

In the step S101, for example, a receiving end measures a first channel parameter and a second channel parameter using first and second symbols received sequentially. In this case, the first/second channel parameter can be an average of per subcarrier SNRs of respective of the first symbol and second symbol received via at least one subcarrier, which does not put limitation on the present invention.

In a second step 102, the receiving end having measured the sequential channel parameters measures a channel quality by considering a time delay attributed to the symbol transmission. In particular, using the first and second channel parameters measured in the step S101, a channel quality is estimated by considering a time delay between measurements of the first and second channel parameters.

Preferably, as mentioned in the foregoing description, channel quality information, which takes the time delay into consideration, can be estimated by additionally considering channel perturbation variation.

In a step S103, the receiving end decides whether to feed back the channel quality information estimated in the step S102 according to the difference between the channel parameters measured in the step S102.

In particular, if a variation of channel parameter between the first and second channel parameters in the aforesaid example is equal to or greater than a prescribed threshold, the receiving end may transmit the estimated channel quality information. In this case, one preferred embodiment of the present invention can further include a step of adjusting the threshold according to the variations of the channel parameters. And, the adjustment of the threshold can be carried out in a manner of lowering the threshold if the variations of the channel parameters increase or raising the threshold if the variations of the channel parameters decrease.

In the above embodiment, the receiving end carries out both the channel quality estimation considering the time delay in the step S102 and the feedback information decision according to the extents of the variations of the channel parameters in the step S103, for example.

Alternatively, the steps S102 and S103 can be separately executed by the receiving end or the transmitting end. For instance, the time delay consideration in estimating the channel quality information in the step S102 can be directly carried out by the receiving end in a manner of measuring the channel parameter according to the received symbol and then using the measured channel parameter. Alternatively, the receiving end carries out the measurement of the channel parameter according to the received symbol only and feeds back the channel parameter to the transmitting end. The transmitting end then estimates the channel quality information by considering the time delay using the fed-back channel parameter.

And, the adjustment of the feedback information according to the extent of the variation of the channel parameter in the step S103 can be the adjustment of the channel quality information estimated in the above example or the channel parameter measured via the received symbol itself.

So, methods for configuring the respective steps of the above-explained embodiment are explained in detail as follows.

First of all, a method of estimating channel quality information by considering a time delay according to one embodiment of the present invention is explained. For this, a transmitter and a receiver for the present embodiment are explained.

Figure 2:
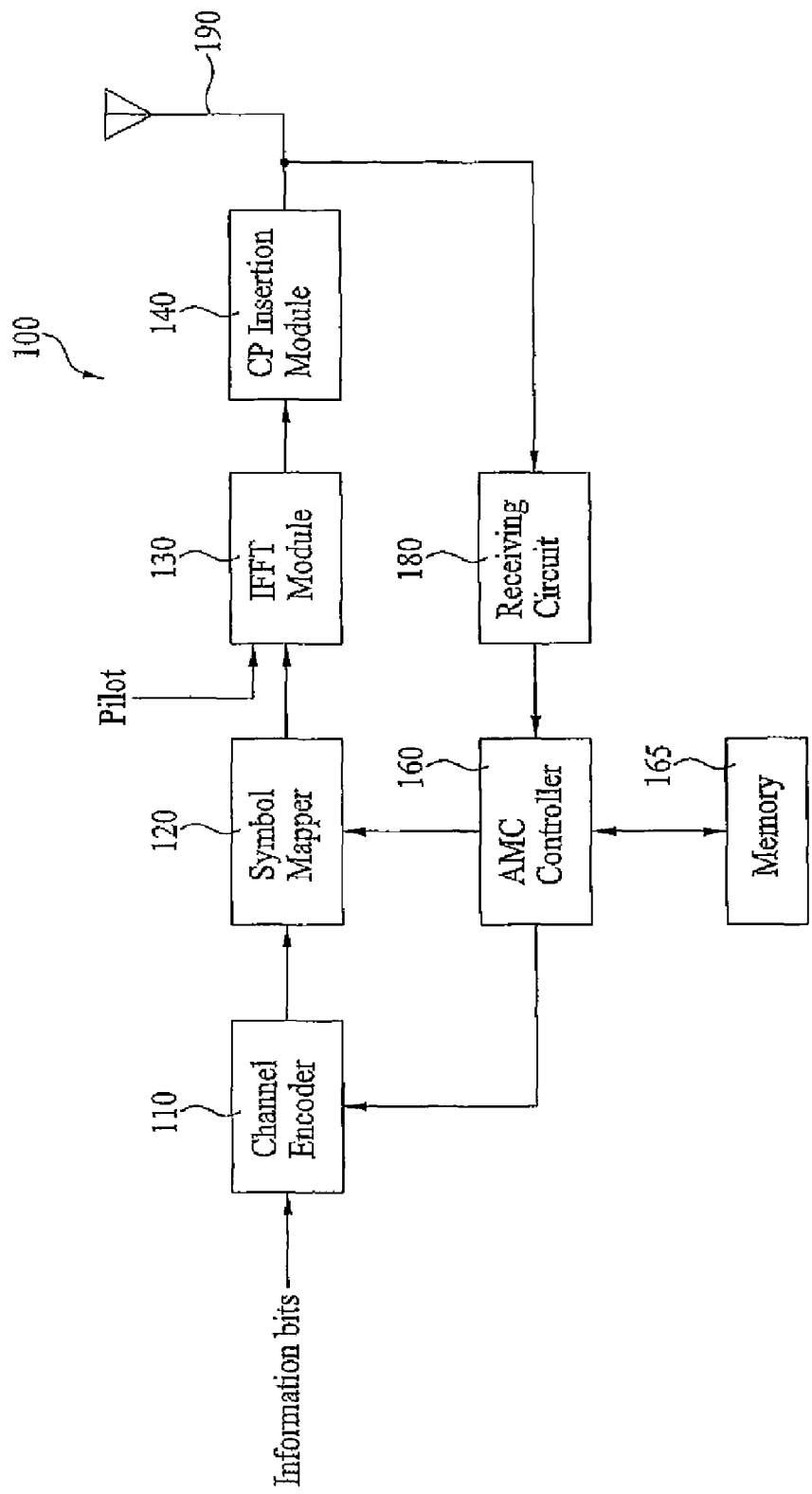
FIG. 2 is a block diagram of a transmitter according to one embodiment of the present invention.

FIG. 2 is a block diagram of a transmitter according to one embodiment of the present invention.

Referring to FIG. 2, a transmitter 100 according to one embodiment of the present invention includes a channel encoder 110, a symbol mapper 120, an IFFT (inverse fast Fourier transform) unit 130, an AMC (adaptive modulation and coding) controller 160, and a receiving circuit 180.

The channel encoder 110 receives a stream of information bits and then encodes the received stream of the information bits by coding scheme under the control of the AMC controller 160 to generate coded data. In this case, the information bits can include text, audio, video and other data. The channel encoder 110 adds error detection bits such as CRC (cyclic redundancy check) to the information bits and can also add redundancy bits for error correction. And, the error correction code can include a turbo code. The turbo code is a systematic code that makes information bits included as systematic bits. In case of the turbo code having a code rate ⅓, two parity bits are allocated to one systematic bit. Yet, the error correction code is not limited to the turbo code and the technical idea of the present invention is applicable to LDPC (low density parity check code), convolution code and the like. And, the channel encoder can include a channel interleaver (not shown in the drawing) for reducing effect of noise generated from a channel in a manner of mixing coded data.

The symbol mapper 120 provides modulated symbols by modulating the coded data of the stream of the information bits by modulation scheme under the control of the AMC controller 160. In particular, the coded data is mapped to modulated symbols for indicating a position according to amplitude and phase constellation by the symbol mapper 120.

The IFFT unit 130 performs IFFT on the inputted symbols to transform into time-domain samples (OFDM symbols). In this case, the symbols inputted to the IFFT unit 130 can include not only the modulated symbols of the coded data but also a separately modulated pilot symbol. The pilot symbol can be the data a priori known to both of the transmitter 100 and the receiver 200. No limitation is put on the arrangements of the modulated symbols of the inputted information bits and the pilot symbols and the arrangements can be made in various ways.

A CP insertion module inserts a CP (cyclic prefix) in time-domain symbols. In this case, the CP can be called a guard interval. The CP changes a frequency-selective channel into a flat-fading channel by removing ISI (inter-symbol interference). A sample signal outputted from the CP insertion module 140 is converted to an analog signal and then transmitted via an antenna 190.

The receiving circuit 180 receives a signal transmitted by the receiver 200 via the antenna 190. The receiving circuit 180 digitalizes the received signal and then sends it to the AMC controller 160.

The AMC controller 160 controls overall operations of the transmitter 100. The AMC controller 160 provides the channel encoder 110 with a coding scheme according to a determined MCS (modulation and coding scheme) and also provides the symbol mapper 120 with a modulation scheme. In this case, the coding scheme can be a code rate and the modulation scheme can be a modulation size.

The AMC controller 160 extracts information from a signal received from the receiving circuit. An operation for extracting the information includes general demodulation and decoding. The extracted information may include an index of MCS level.

A lookup table for the index of the MCS levels stored in the memory. An example of the MCS lookup table is shown in Table 1.

TABLE 1

| Index | Modulation | Code rate |
|-------|------------|-----------|
| 1 | QPSK | ⅓ |
| 2 | QPSK | ½ |
| 3 | QPSK | ⅔ |
| 4 | QPSK | ¾ |
| 5 | 16QAM | ⅓ |
| 6 | 16QAM | ½ |
| 7 | 16QAM | ⅔ |
| 8 | 16QAM | ¾ |
| 9 | 64QAM | ⅓ |
| 10 | 64QAM | ½ |
| 11 | 64QAM | ⅔ |
| 12 | 64QAM | ¾ |

Table 1 is just exemplary. And, modulation scheme and coding scheme according to the number of indexes and each of the indexes can vary. For instance, the modulation scheme is not limited and can include m-PSK (m-quadrature phase shift keying) or m-QAM (m-quadrature amplitude modulation). For instance, the m-PSK can include QPSK, BPSK or 8-PSK. And, the m-QAM can include 16-QAM, 64-QAM or 256-QAM.

The decided coding scheme and the decided modulation scheme can be identically applied to all subcarriers. And, a power can be identically applied to all subcarriers under the restriction of total transmission power.

The AMC controller 160 decides a coding scheme and modulation scheme according to MCS level and then controls the channel encoder 110 and the symbol mapper 120 through the decided coding and modulation schemes. The channel encoder 110 outputs data coded by the selected coding scheme. And, the symbol mapper 120 maps data coded by the selected modulation scheme.

Figure 3:
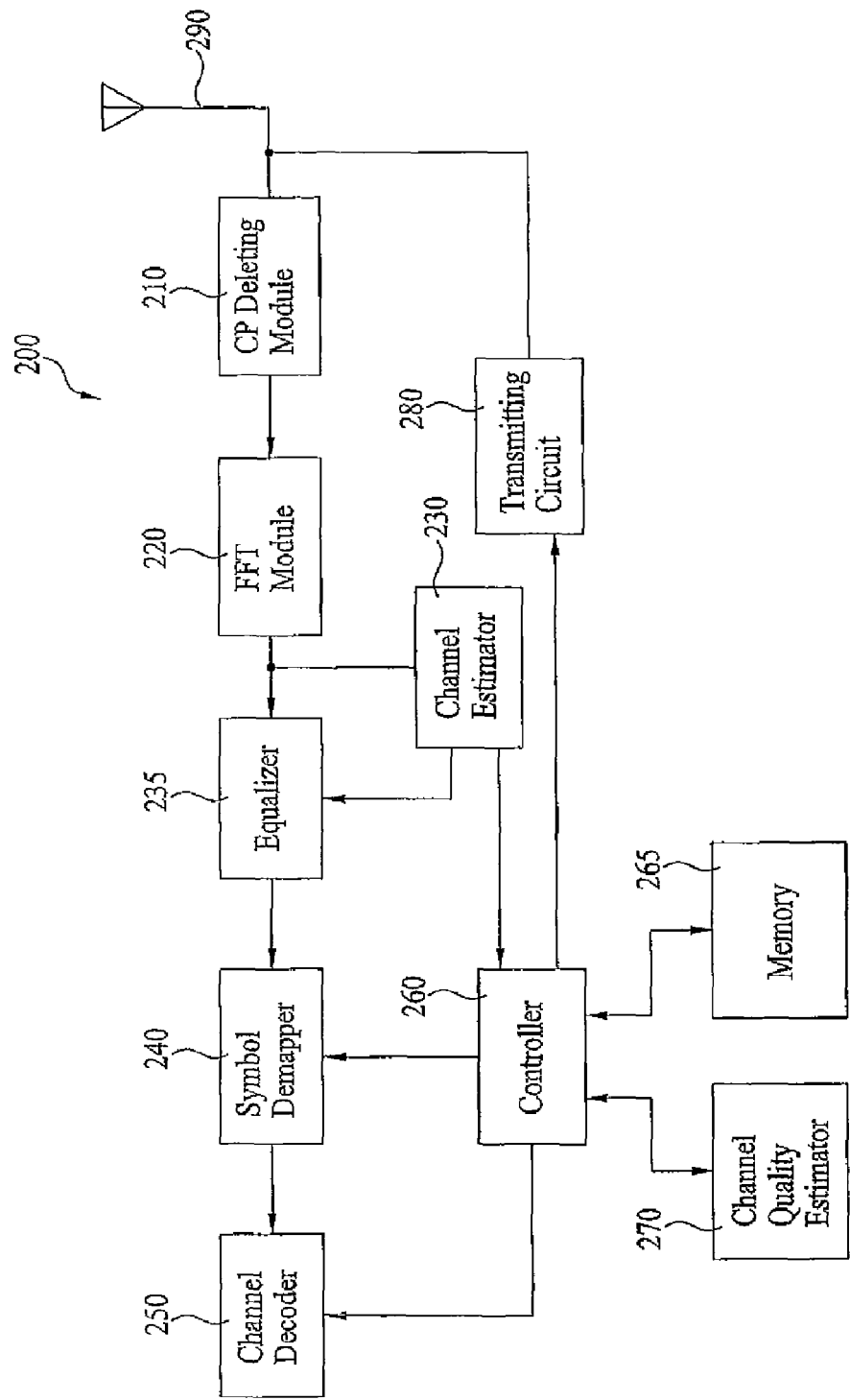
FIG. 3 is a block diagram of a receiver according to one embodiment of the present invention.

FIG. 3 is a block diagram of a receiver according to one embodiment of the present invention.

Referring to FIG. 3, a receiver 200 according to one embodiment of the present invention includes a CP deleting module 210, an FFT unit 220, a channel estimator 230, a symbol demapper 240, a channel decoder 250, a controller 260, a channel quality estimator 270, and a transmitting circuit 280.

A signal received via an antenna 290 is digitized. And, CP is deleted from the signal by the CP deleting module 210. The CP-deleted samples undergo FFT by the FFT unit 220 to be transformed into symbols on a frequency domain.

The channel estimator 230 estimates channel information by extracting a pilot symbol from an output of the FFT unit 220. In this case, the channel information can include an estimated response H of a channel or correspond to a concept included in the channel parameter of the above-explained embodiment of the present invention.

An equalizer 235 equalizes symbols using the estimated channel information.

The symbol demapper 240 is controlled by a demodulation signal of the controller 260 to demap symbols to coded data again. A demodulation scheme provided by the controller 260 corresponds to the modulation scheme provided to the symbol mapper 120 by the AMC controller 160.

The channel decoder 250 is controlled by a decoding signal of the controller 260 to decode the coded data. The channel decoder 250 outputs estimated data bits. In this case, the decoding scheme provided by the controller 260 corresponds to the coding scheme provided to the channel encoder 110 by the AMC controller 160.

The controller 260 controls overall operations of the receiver 200 and selects an MCS level capable of maximizing a data rate under the limitation of target error rate through a channel equality estimated by the channel quality estimator 270.

A link curve table can be stored in the memory 265. The link curve table is the table having a threshold of a channel quality that meets a target FER limit using a simulation result according to a modulation scheme and code rate used by the system. And, the controller 260 determines a maximum MCS level corresponding to the threshold of the channel quality which meets the estimated channel quality.

And, a lookup table for MCS level can be stored in the memory 265. The lookup table may be identical to that stored in the memory 165 of the transmitter 100. The controller 260 determines an index of MCS level by referring to the lookup table according to the determined MCS level.

The transmitting circuit 280 is provided with the index of MCS level from the controller 270 and then transmits the provided index of the MCS level to the transmitter via the antenna 290. Namely, the load of a transport channel is minimized by feeding back the index of the MCS level only.

The channel quality estimator 270 considers influence on a time delay of channel and estimates a channel quality using the channel information by the channel estimator 230. In this case, the channel quality can include a signal-to-noise ratio (SNR).

Figure 4:
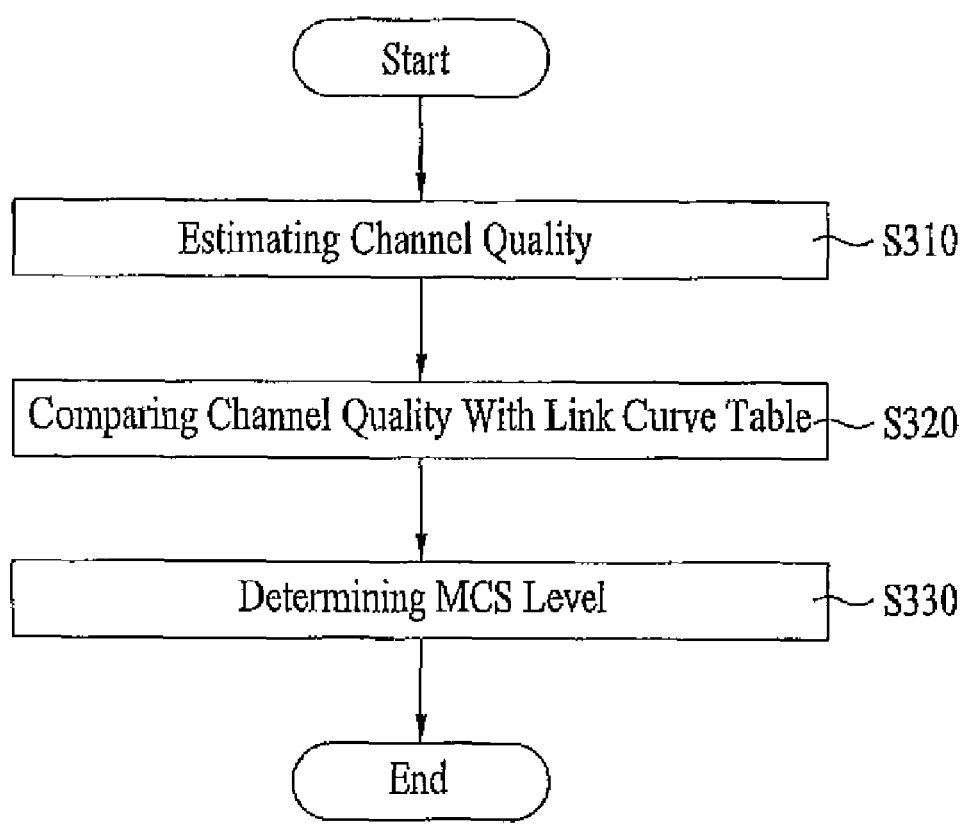
FIG. 4 is a flowchart of a method of deciding an adaptive modulation and coding scheme according to one embodiment of the present invention.

FIG. 4 is a flowchart of a method of deciding an adaptive modulation and coding scheme according to one embodiment of the present invention.

Referring to FIG. 4, a channel quality is estimated using channel information (S301). In this case, the channel quality can correspond to SNR. And, the SNR can be found by Formula in a manner of considering a time delay.

$$SNR = \frac{1}{N}\sum_{n=1}^{N}\left(|\overline{H}_n|^2 E_s/\sigma_n^2\right) \qquad \text{[Formula 1]}$$

In Formula 1, 'N' indicates the number of subcarriers (N≧1), '$\overline{H}_n$' indicates channel information that considers a time delay for an $n^{th}$ subcarrier, '$E_s$' indicates average signal energy, and '$\sigma_n^2$' indicates noise energy. In case of using a plurality of subcarriers like OFDM, the SNR can correspond to an average SNR for SNRs of a plurality of subcarriers.

According to one embodiment of the present invention, the channel information $\overline{H}_n$, which considers the time delay, can by found by Formula 2 using channel information of a previous transmission and channel information of a current transmission.

$$|\overline{H}_n|^2 = \frac{|H_n^k|^2 + |H_n^{k-1}|^2}{2} \qquad \text{[Formula 2]}$$

In Formula 2, '$H_n^{K-1}$' indicates channel information for an $n^{th}$ subcarrier of a previous transmission (first channel information) and '$H_n^{K}$' indicates channel information for an $n^{th}$ subcarrier of a current transmission (second channel information).

If Formula 2 is inserted in Formula 1, SNR can be found by Formula 3.

$$SNR = \frac{1}{N}\left(\sum_{n=1}^{N}\frac{|H_n^k|^2 + |H_n^{k-1}|^2}{2}E_s/\sigma_n^2\right) \qquad \text{[Formula 3]}$$

In the present embodiment, the channel information of the previous transmission is stored in the memory 265 to be used in finding SNR of a current channel. In particular, a channel quality is estimated using both of the channel information of the current transmission and the channel information of the previous transmission. So, it is able to estimate a future channel quality more accurately and also able to compensate for a time delay of channel.

In a channel status having a large user mobility, channel information may differ in each transmission. Specifically, despite that there is a big difference between channel information of a previous transmission and channel information of a current transmission, if an MCS level is determined using the current channel information only, performance of AMC scheme may be considerably degraded.

So, it is able to predict a future channel quality by estimating a channel quality using both the previous channel information and the current channel information. Despite that user mobility increases, it is able to reduce the degradation of performance in a manner that the estimated channel quality is reflected on future modulation and coding schemes.

For previous channel information, one average for all subcarriers can be used. In this case, channel information $\overline{H}_n$ considering a time delay can be found by Formula 4.

$$|\overline{H}_n|^2 = \frac{|H_n^k|^2 + |H_{avg}^{k-1}|^2}{2} \qquad \text{[Formula 4]}$$

In Formula 4, it is $$|H_{avg}^{k-1}|^2 = \frac{1}{N}\sum_{n=1}^{N}|H_n^{k-1}|^2.$$

Thus, in case of using one average as the previous channel information, a storage size of the memory 265 can be reduced smaller rather than storing the previous channel information for the entire subcarriers.

Besides, it is able to consider not only the previous channel information but also further previous channel information. For instance, it is able to find channel information $\overline{H}_n$ considering a time delay using further previous channel information ($H_n^{K-2}$, $H_n^{K-3}$, etc.) as well as $H_n^{K-1}$. A case of considering a plurality of previous channel informations is represented as Formula 5.

$$|H_n|^2 = \frac{|H_n^k|^2 + \sum_{m=1}^{L} |H_n^{k-m}|^2}{L+1} \qquad \text{[Formula 5]}$$

In Formula 5, 'L' indicates the number of previous channel informations. By finding $\overline{H}_n$ using a current channel information and a plurality of previous channel informations ($H_n^{K-2}$, $H_n^{K-3}$, etc.), a channel quality is estimated more accurately despite that user mobility increases. So, the estimated channel quality can be reflected on deciding MCS.

In Formula 4 or Formula 5, a simple average is taken for each channel information. Instead, a weight can be given to each channel information. This can be represented as Formula 6.

$$|H_n|^2 = w_0 |H_n^k|^2 + \sum_{m=1}^{L} w_m |H_n^{k-m}|^2 \qquad \text{[Formula 6]}$$

In Formula 6, 'w' indicates a weight for each channel information and meets $$\sum_{m=0}^{L} w_m = 1,.$$

The weight can be various adjusted to correspond to a channel environment. And, the weight can be varied for each user.

According to another embodiment, channel information $\overline{H}_n$ considering a time delay can be found by Formula 7 using channel perturbation variation.

$$|\overline{H}_n|^2 = |H_n|^2 + (1-|\rho|^2)\sigma_h^2 \qquad \text{[Formula 7]}$$

In Formula 7, '$H_n$' indicates channel information for an $n^{th}$ subcarrier and '$\sigma_h^2$' indicates average energy of channel. And, '$\rho$' is a variable, which is found using Bessel function by considering a Doppler frequency $f_d$ and a time delay $\tau_d$ in a time varying channel environment, and can be expressed as $\rho = J_0(2\pi f_d \tau_d)$. A value of '$\rho$' tends to decrease if user mobility increases. And, '$\rho=1$' indicates perfect channel information.

If Formula 7 is inserted in Formula 1, SNR can be found by Formula 8.

$$SNR = \frac{1}{N} \sum_{n=1}^{N} \left( (|H_n|^2 + (1-|\rho|^2)\sigma_h^2) \frac{E_s}{\sigma_n^2} \right) \qquad \text{[Formula 8]}$$

Through the variable $\rho$ that varies according to the increasing user mobility, it is able to reflect the user mobility on the channel quality estimation. So, it is able to compensate for an error variation factor due to a time delay of channel.

According to a further embodiment, channel information $\overline{H}_n$ considering a time delay can consider channel perturbation variation together with channel information of a previous transmission. This is represented as Formula 9.

$$|\overline{H}_n|^2 = \frac{|H_n|^2 + |H_n^{k-1}|^2}{2} + (1-|\rho|^2)\sigma_h^2 \qquad \text{[Formula 9]}$$

If Formula 9 is inserted in Formula 1, SNR can be found by Formula 10.

$$SNR = \frac{1}{N} \sum_{n=1}^{N} \left( \left( \frac{|H_n|^2 + |H_n^{k-1}|^2}{2} + (1-|\rho|^2)\sigma_h^2 \right) E_s / \sigma_n^2 \right) \qquad \text{[Formula 10]}$$

Referring to FIG. 4 again, after completion of estimating the channel quality, the estimated channel quality is compared to a link curve table (S320).

Subsequently, an MCS level capable of maximizing a data rat suitable for a give target error rate is determined (S330).

An index of the determined MCS level is found and then fed back to the transmitter 100.

The transmitter 100 then decides coding and modulation schemes of a symbol, which is to be transmitted, from the index of the MCS level.

Although the above description deals with the scheme for determining one MCS level by averaging SNRs of the entire subcarriers, it is able to perform estimation by sorting SNRs of some of subcarriers. In particular, subcarriers are grouped into a plurality of sub=band groups, a channel quality is estimated for each of the sub-band groups, and an MCS level is then determined for each of the sub-band groups.

Figure 5:
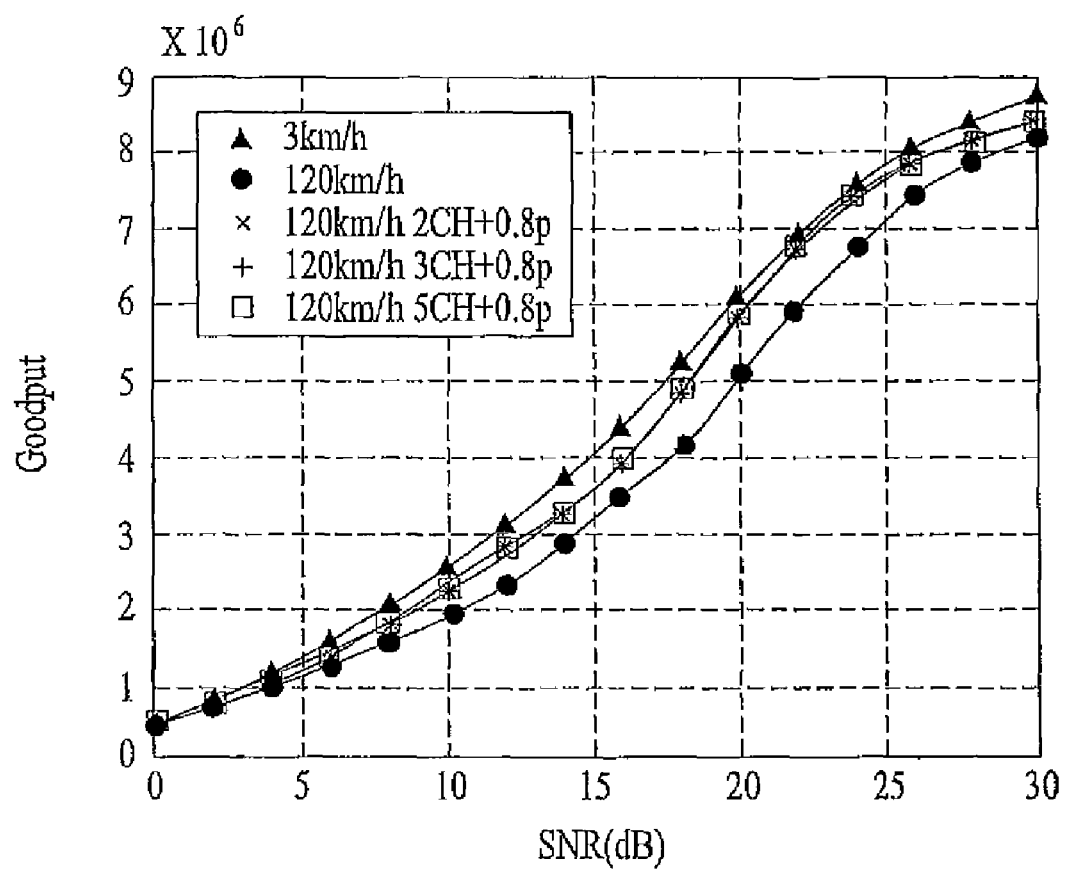
FIG. 5 is a graph of a simulation result by SNR to data rate (goodput)

FIG. 5 is a graph of a simulation result by SNR to data rate (goodput). SNR estimation by Formula 10 is used for a channel quality. '2CH' indicates a case of using current channel information and previous channel information. '3CH' indicates a case of using current channel information, previous channel information, and channel information prior to the previous channel information. And, '4CH' indicates a case of using current channel information and four previous channel informations prior to the current channel information in sequence. Moreover, '0.8$\rho$' indicates '$\rho=0.8$' is used.

Referring to FIG. 5, even if user mobility increases, a time delay is compensated fro by the present invention. So, a data rate of system is enhanced. The compensated extent is raised as more previous channel informations are used.

Figure 6:
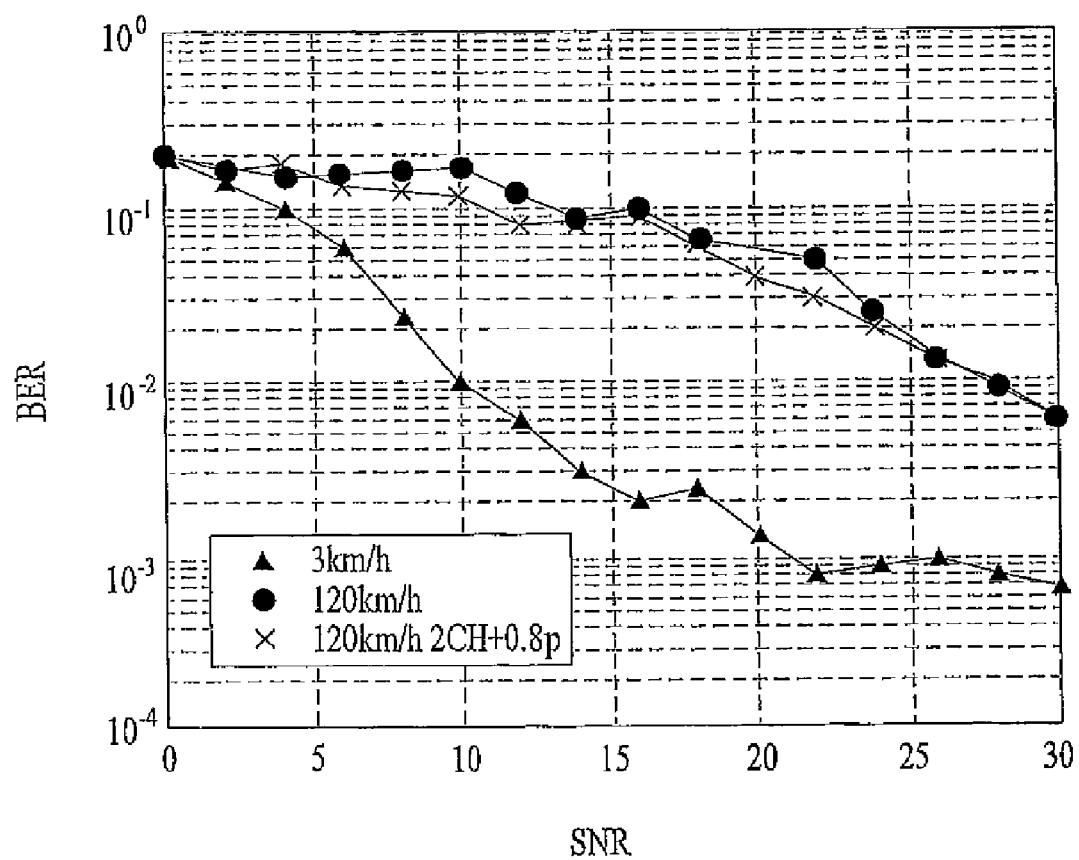
FIG. 6 is a graph of a simulation result by SNR to BER.

FIG. 6 is a graph of a simulation result by SNR to BER (bit error rate). For a channel quality, SNR estimation by Formula 10 is used. '2CH' indicates a case of using current channel information and previous channel information. And, '0.8$\rho$' indicates '$\rho=0.8$' is used.

Referring to FIG. 6, in case of the related art, as user mobility increases, performance gets degraded. In case of the present invention, performance becomes enhanced by compensating for a time delay.

Meanwhile, the channel quality estimation by considering a time delay according to the embodiment of the present invention can be carried out by the transmitter as well as the receiver. In particular, channel information is fed back to the transmitter by the receiver and the transmitter is then able to estimate a channel quality by considering a time delay. A configuration of the transmitter capable of performing this function ix explained as follows.

Figure 7:
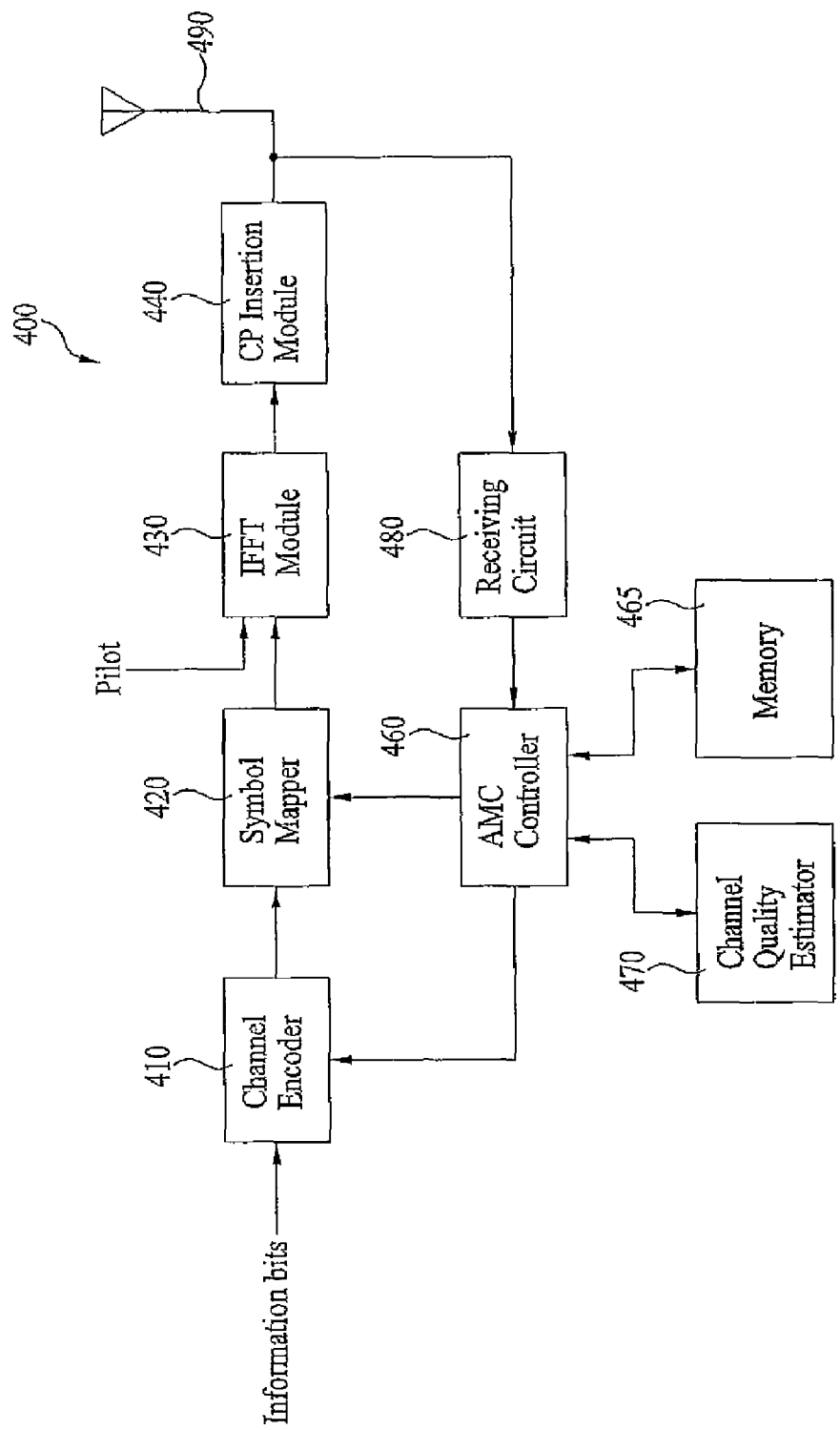
FIG. 7 is a block diagram of a transmitter according to another embodiment of the present invention.

FIG. 7 is a block diagram of a transmitter according to another embodiment of the present invention.

Referring to FIG. 7, a transmitter according to another embodiment of the present invention includes the elements of the former transmitter 100 shown in FIG. 1 and further includes a channel quality estimator 470. In particular, the transmitter 400 estimates a channel quality and then determines an MCS level. According to the determined MCS level, suitable coding and modulating schemes are provided to a channel encoder 410 and a symbol mapper 420, respectively.

Channel information used to estimate a channel quality can be fed back by a receiver (not shown in the drawing).

In particular, a signal carrying channel information is received from the receiver by a receiving circuit 480 via an antenna 490. An AMC controller 460 extracts the channel information from the signal received by the receiving circuit 480 and then provides the extracted channel information to the channel quality estimator 470. And, previous channel information and a link curve table are stored in a memory 465.

The channel quality estimator 470 estimates a channel quality through the channel information.

The AMC controller 460 selects an MCS level, which is capable of maximizing a data rate under a target error rate limit, through the channel quality estimated by the channel quality estimator 470.

In case that the transmitter 400 measures a channel quality, a load put on a transport channel according to feedback of channel information may be increased. Yet, it is able to reduce power consumption and memory storage size due to the calculation of the receiver 200 for the channel quality.

In the above description, the multi-carrier communication system using OFDM has been explained. Yet, the technical idea of the present invention is directly applicable to a single-carrier communication system as well. The single-carrier communication system is able to utilize such single-carrier modulation scheme as SC-CDMA (single-carrier frequency division multiple access), CDMA (code division multiple access), etc. In the single-carrier system, SNR for one subcarrier can be estimated for a channel quality instead of estimating average SNR for a plurality of subcarriers.

In the above description, a single-input single-output (SISO) having a single transmitting antenna and a single receiving antenna has been explained. Yet, the technical idea of the present invention is intactly applicable to a multiple-input multiple-output (MIMO) system.

The estimated SNR is usable in determining MSC by AMC scheme and also usable for other schemes. For instance, the estimated SNR is usable for power control, mobile assisted handoff, soft decoding, diversity combining scheme, and the like.

Moreover, SIR (signal-to-interference ratio) estimation can be regarded as a sort of SNR estimation. This is because a total of multiple interferences in CDMA system indicates Gaussian Distribution by central limit theorem.

A method of adjusting a presence or non-presence of feedback in correspondence to an extent of variation of a channel parameter according to one preferred embodiment of the present invention is explained as follows. For this, configurations of transmitter and receiver for the present embodiment are preferentially explained in the following description.

Figure 8:
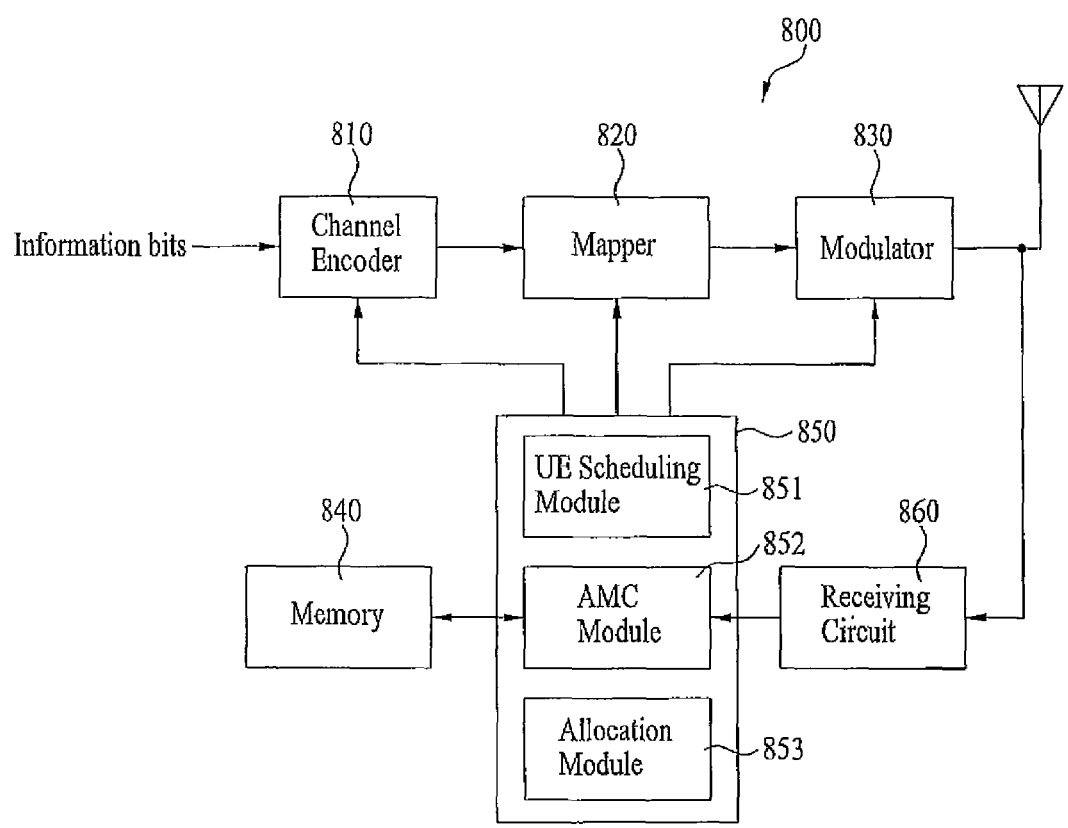
FIG. 8 is a block diagram of a transmitter in a communication system according to one embodiment of the present invention.

FIG. 8 is a block diagram of a transmitter in a communication system according to one embodiment of the present invention.

Generally, a communication system includes a transmitter and a receiver. In this case, the transmitter and receiver explained can be a transceiver capable of performing both functions of transmission and reception. Yet, to clearly explain feedback, one side responsible for transmission of normal data is named a transmitter and the other side responsible for transmitting feedback data to the transmitter is named a receiver.

In downlink, a transmitter can be a part of a base station and a receiver can be a part of a mobile station. In uplink, a transmitter can be a part of a mobile station and a receiver can be a part of a base station. Besides, a base station can include a plurality of receivers and a plurality of transmitters. And, a mobile station can include a plurality of receivers and a plurality of transmitters.

Referring to FIG. 8, a transmitter 800 according to one embodiment of the present invention includes a channel encoder 810, an adaptive mapper 820, a modulator 830, a memory 840, a controller 850, and a receiving circuit 860.

The channel encoder 810 receives a stream of information bits and then encodes the received stream of the information bits by predetermined coding scheme to generate coded data. In this case, the information bits can include text, audio, video and other data. The channel encoder 810 adds error detection bits such as CRC (cyclic redundancy check) to the information bits and can also add redundancy bits for error correction. And, the error correction code can include a turbo code, a low density parity check (LDPC) code or a convolutional code. Moreover, the error correction code can include one of other codes capable of performing error correction.

The mapper 820 provides transmission symbols by modulating the coded data of the stream of the information bits by predetermined modulation scheme. In particular, the coded data is mapped to modulated symbols for indicating a position according to amplitude and phase constellation by the mapper 820. No limitation is put on the modulation scheme. And, the modulation scheme can be m-PSK (m-quadrature phase shift keying) or m-QAM (m-quadrature amplitude modulation). For instance, the m-PSK can include QPSK, BPSK or 8-PSK. And, the m-QAM can include 16-QAM, 64-QAM, or 256-QAM.

The modulator 830 modulates transmission symbols by a multiple access modulation scheme. No limitation is put on the multiple access modulation scheme. And, a single-carrier modulation scheme known well as CDMA or a multi-carrier modulation scheme such as OFDM can be adopted.

The receiving circuit 860 receives a signal transmitted from a receiving end via an antenna, digitalizes the received signal, and then sends the digitalized signal to the controller 850.

The information extracted from the signal received by the receiving circuit 860 can include channel quality information (CQI). The CQI is the information fed back to the transmitter 800 by the receiving end for a channel environment, a coding scheme, or a modulation scheme. In particular, the CQI can correspond to index information for designating a specific coding rate and/or a modulation scheme or size. And, an MCS (modulation and coding scheme) level index is usable as the index information.

In the memory 840, a lookup table, which includes items of coding rate and modulation scheme to be applied to the inputted information bits and at least one MCS level index item matched with the former items, is stored.

The controller 850 controls overall operations of the transmitter 800, and more particularly, includes a user equipment (UE) scheduling module 851, an AMC (adaptive modulation and coding) module 852, and an allocation module 853.

The UE scheduling module 851 determines a user equipment, to which data will be transmitted, using prescribed identification information included in the information fed back from the receiving end.

The AMC module 852 decides a coding rate and a modulation scheme to apply to the inputted information bits using the feedback information from the receiving end. For this, the AMC module 852 selects a specific coding rate and a specific modulation scheme corresponding to the fed-back index information (e.g., MCS level index) from the lookup table.

The allocation module 853 decides a data allocation scheme, which is to be executed later, by considering the channel information and/or moving speed fed back from the receiving end. The data allocation scheme include one of a localized scheme for binding user data into one block to transmit and a distributed scheme for transmitting user data by evenly distributing the user data across entire subcarrier bands. Optionally, either the localized or distributed scheme can be used or both of the localized and distributed schemes are simultaneously used through combination thereof. Alternatively, the allocation module 153 is able to directly determine a specific data allocation scheme by receiving an index for designating a data allocation scheme from the receiving end through feedback.

Figure 9:
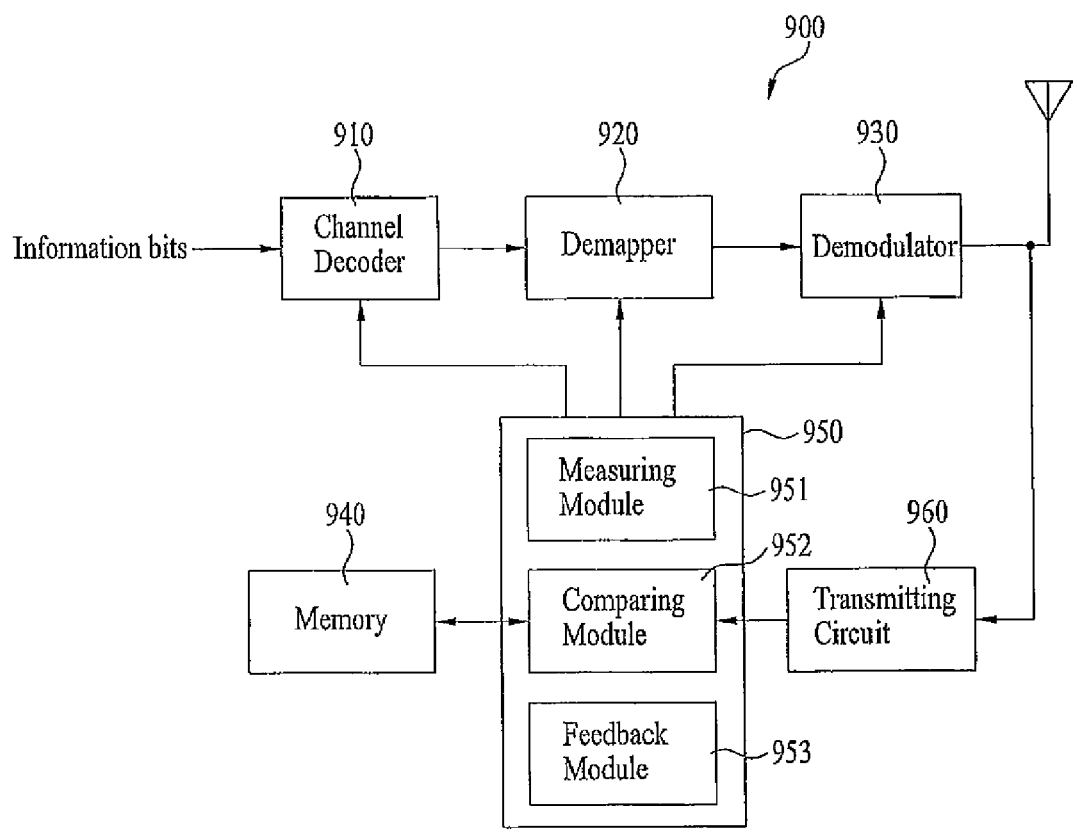
FIG. 9 is a block diagram of a receiver in a communication system according to one embodiment of the present invention.

FIG. 9 is a block diagram of a receiver in a communication system according to one embodiment of the present invention.

Referring to FIG. 9, a receiver 900 according to one embodiment of the present invention includes a channel decoder 910, a demapper 920, a demodulator 930, a memory 940, a controller 950, a transmitting circuit 960, and an antenna.

A signal received via the antenna is demodulated by the demodulator 930 and then demapped into coded data by the demapper 920. The data coded by demapping is decoded by the channel decoder 910. In this case, a control signal for the demapping can be set up in the controller 950 in advance. Alternatively, the demapping control signal can be received from the transmitter 800.

Figure 10:
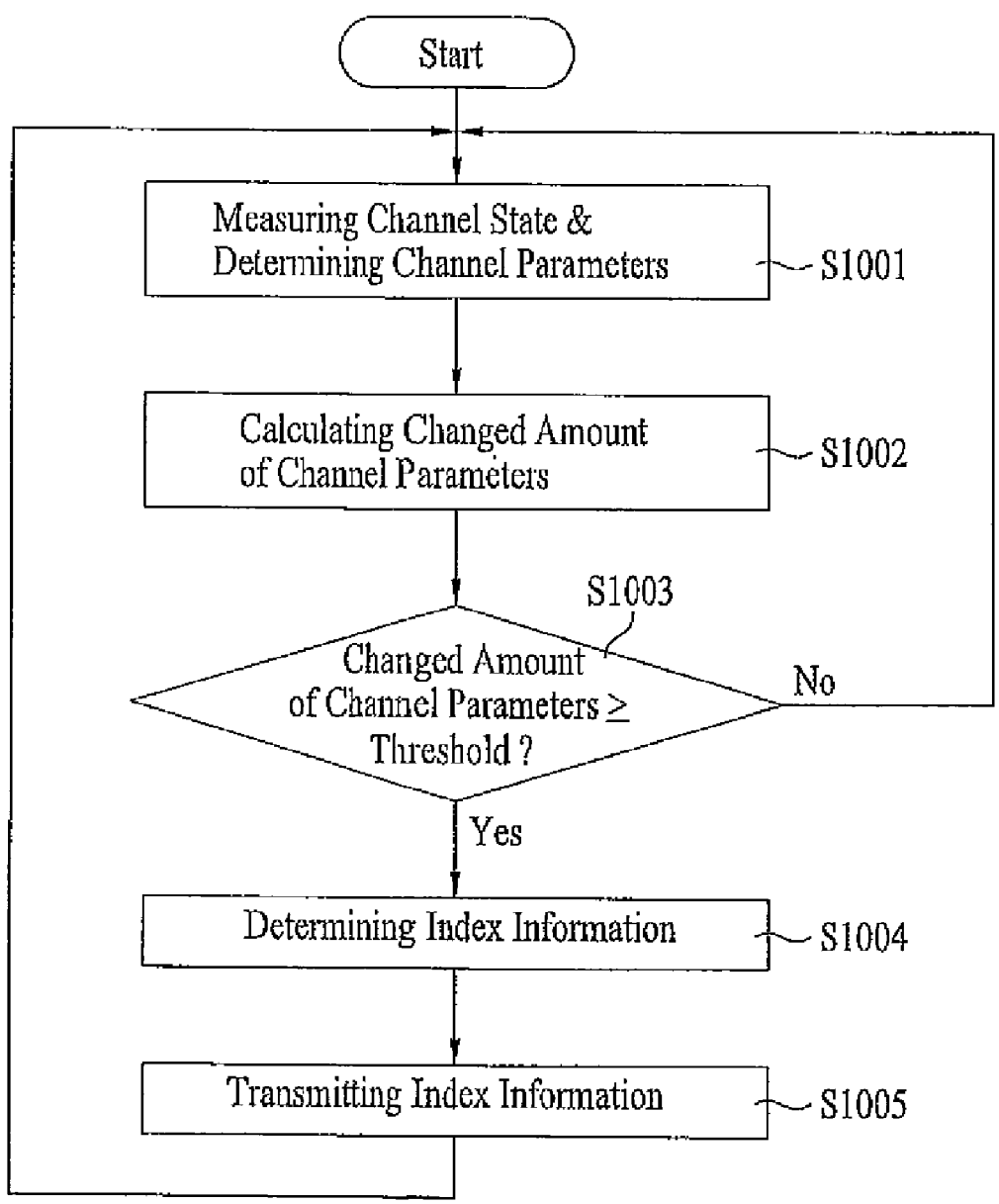
FIG. 10 is a flowchart of a feedback information adjusting method according to one embodiment of the present invention.

The controller 950 controls overall operations of the receiver 900. And, the controller 950 includes a measuring module 951 for measuring a channel parameter, a comparing module 952 for deciding a presence or non-presence of a feedback information transmission using the channel parameter, and a feedback module 953 for transmitting prescribed feedback information to a transmitter. A feedback process carried out by the controller 950 is explained in detail as follows. For reference, FIG. 10 is a flowchart of a feedback information adjusting method according to the present invention.

First of all, the measuring module 951 measures a channel status such as a signal-to-noise ratio (SNR) (or signal to interference and noise ratio: SINR) for a subcarrier of a specific channel, a power of a corresponding channel and the like and then decides the measured channel status as a channel parameter (S1001). Optionally, the measuring module 951 decides an average of SNRs and/or powers of subcarriers of all channels or each subcarrier group including a predetermined number of subcarriers as a channel parameter (S1001). In order for the measuring module 951 to measure the SNR or power, a pilot symbol can be included in a transmission symbol received from the transmitter 800.

In case of using the SNR for the entire subcarriers as the channel parameter, the corresponding channel SNR can be measured by Formula 11.

$$SNR = \frac{1}{N}\sum_{n=1}^{N}(|H_n|^2 E_s / \sigma_n^2) \quad \text{[Formula 11]}$$

In formula 11, 'SNR' is an average of signal-to-noise ratios measured for the entire subcarriers, 'N' indicates a total number of subcarriers, '$H_n$' indicates channel information for an $n^{th}$ subcarrier, '$E_s$' indicates average signal energy, and '$\sigma_n^2$' indicates noise energy.

Yet, according to one preferred embodiment of the present invention, the SNR can be measured by Formulas 1, 3, 8 and 10 as observed in the embodiment of the channel quality estimation by considering the time delay.

Meanwhile, the comparing module 952 calculates a channel parameter variation amount in a manner of comparing a channel parameter previously stored in the memory 940 to the measured channel parameter (S1002). If the calculated channel parameter variation amount is greater than a threshold previously stored in the memory 940, the comparing module 952 sends a feedback transmission control signal to the feedback module 953. The above-explained operation of the comparing module 952 can be carried out by a preset period. In this case, the period is preferably set short enough to enable sufficient feedback information to be provided in a maximum parameter variation situation allowed by a communication system.

In case of using a channel power as a channel parameter, the comparing module 952 can use Formula 2 to decide whether to transmit feedback information for example.

$$\left| \text{power}(H_k) - \frac{w_1 \text{ power}(H_{k-1}) + w_2 \text{ power}(H_{k-2}) + \ldots + w_m \text{ power}(H_{k-m})}{m} \right| \quad \text{[Formula 12]}$$

$$\geq \text{ or } \leq \text{Threshold}$$

A channel parameter variation amount is calculated from a difference between a channel parameter a current timing point and a previous channel parameter stored previously. In this case, the previous channel parameter stored previously can be a channel parameter measured right before or an average of the predetermined number of channel parameters measured previously. And, the previous channel parameter stored previously may be a value resulting from giving a prescribed weight to a further previous channel parameter or the predetermined number of channel parameters previously measured.

Formula 12 shows an embodiment of comparing a channel power variation, which results from a difference between a channel power at a timing point k and an average generated from m previously measured channel powers having a prescribed weight w applied thereto, to a threshold.

If SNR or SINR is used as a channel parameter, the comparing module 952 can use Formula 13 or Formula 14 to decide whether to transmit feedback information. In this case, it should be understood that implementation becomes complicated due to considering signal energy and noise energy as well as a channel power.

$$SNR_k - SNR_{k-1} = \quad \text{[Formula 13]}$$

$$\frac{1}{N}\sum_{n=1}^{N}(|H_{n,k}|^2 E_s / \sigma_{n,k}^2) - \frac{1}{N}\sum_{n=1}^{N}(|H_{n,k-1}|^2 E_s / \sigma_{n,k-1}^2)$$

$$\geq \text{ or } \leq \text{Threshold}$$

$$\left| SNR_k - \frac{w_1 SNR_{k-1} + w_2 SNR_{k-2} + \ldots + w_m SNR_{k-m}}{m} \right| \quad \text{[Formula 14]}$$

$$\geq \text{ or } \leq \text{Threshold}$$

In this case, both a linear domain and a log domain can be considered for a value of SNR.

Formula 13 shows an embodiment of comparing a channel parameter variation amount, which results from a difference between an SNR at a timing point k and an SNR at a timing point k−1 right before the timing point k as a previous channel parameter previously stored, to a threshold.

And, Formula 14 shows an embodiment of comparing a channel parameter variation, which results from a difference between a channel power at a timing point k and an average generated from m previously measured SNRs having a prescribed weight w applied thereto, to a threshold.

In the comparing module 952, the threshold is a reference value for deciding whether to transmit the feedback information to the transmitter 800. And, the threshold is set by considering at least one of a previously normalized feedback information size, a target QoS (quality of service), and user mobility. In this case, a frame error rate (FER) can be used as the QoS.

Generally, the FER tends to be lowered as the feedback information size increases, and vice versa. So, a suitable trade-off point is needed between a target QoS and a feedback information size. The trade-off point can be modified by the controller according to a preset policy or a preset event occurrence.

In case of receiving a feedback transmission control signal from the comparing module 952, the feedback module 953 determines prescribed index information using the channel parameter received from the measuring module 951 or the corresponding channel parameter (S1004). The feedback module 953 then transmits the decided index information to the transmitter 800 via the transmitting circuit 960 (S1005).

In particular, if the feedback transmission control signal is received from the comparing module 952, the feedback module 953 decides a coding rate and a modulation scheme or size capable of maximumly approximating to a previously established target QoS (quality of service) using the measured channel parameter received from the measuring module 951 and also decides prescribed index information corresponding to the decided coding rate and the modulation scheme or size. The index information can include an MCS level index corresponding to the measured channel parameter and can further include an allocation index for designating a specific allocation scheme (e.g., distributed scheme or localized scheme.

The feedback module 953 is able to determine an MCS level index corresponding to the SNR value calculated by Formula 11 in a manner of searching the link curve table of the memory 940. The link curve table is a database for SNR thresholds which were found through simulation to implement the target QoS. The link curve table includes at least one SNR threshold item and a corresponding MCS level index item. Selectively, the feedback module 953 is able to immediately transmit the SNR threshold for implementation of the target QoS to the transmitter 800. And, a frame error rate (FER) is usable as the QoS.

And, the feedback module 953 can carry out general channel encoding, general modulation, and the like to transmit feedback information via the transmitting circuit 960.

Figure 11:
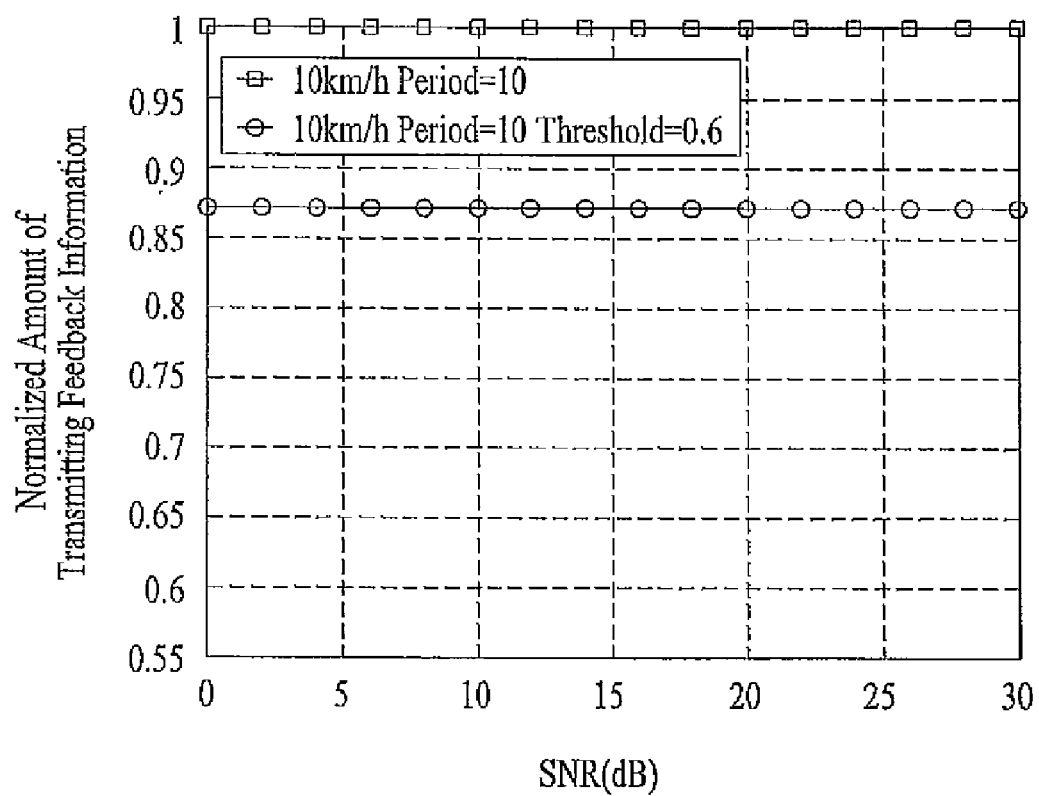
FIG. 11 is a graph for feedback information amount reduced by the present invention.
Figure 12:
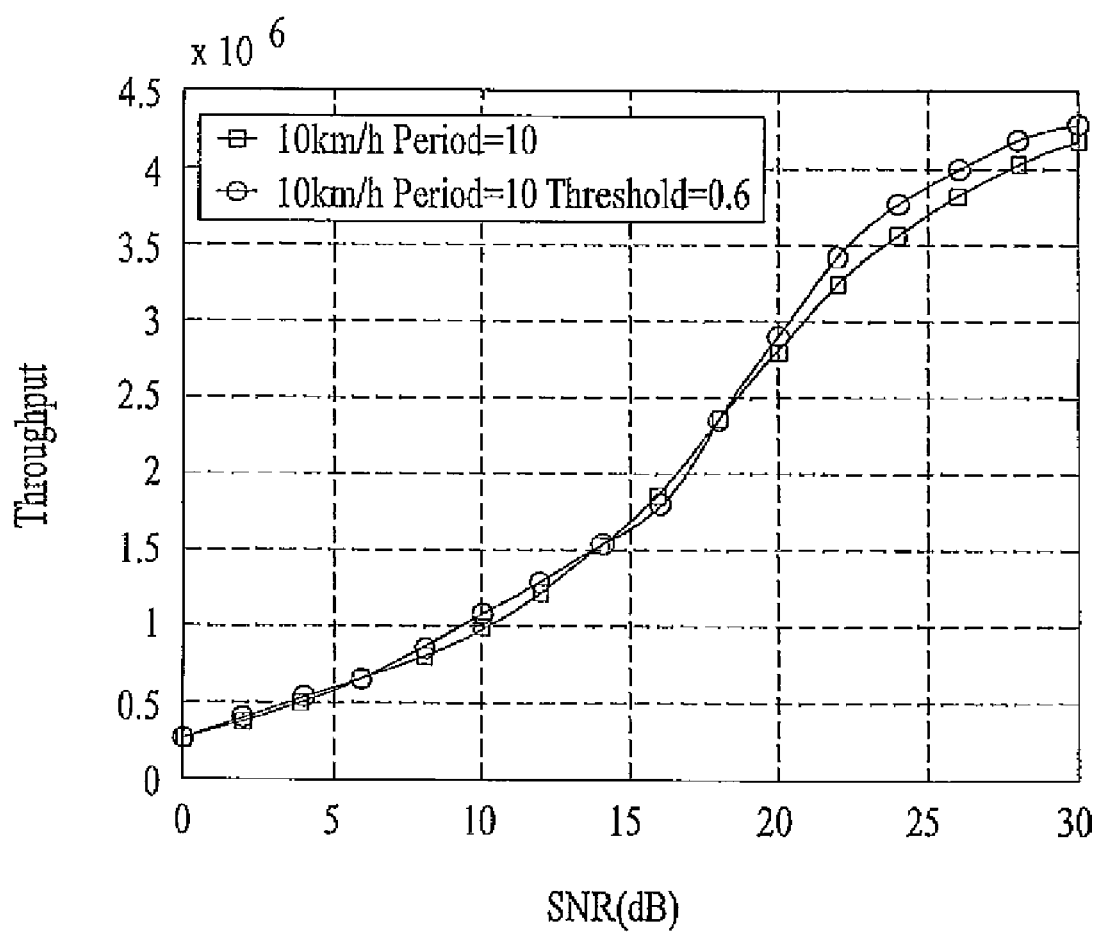
FIG. 12 is a graph of transmitter throughputs for comparison between a communication system of the present invention and a related art communication system.

FIG. 11 is a graph for feedback information amount reduced by the present invention and FIG. 12 is a graph of transmitter throughputs for comparison between a communication system of the present invention and a related art communication system. In FIG. 11 and FIG. 12, it is assumed that a user's moving speed and a feedback period are 10 km/h and 10 ms, respectively.

Referring to FIG. 11, if a value of normalizing a fed-back information amount in a related art communication system is 1, it can be observed that a communication system of the present invention reduces a fed-back information amount into 0.87 by setting a threshold to 0.6. And, it can be observed from FIG. 12 that there is no big difference in a data rate between the related art communication system and the present invention communication system despite that the fed-back information amount is reduced as shown in FIG. 11. Hence, the present invention reduces the fed-back information amount without degrading transmission efficiency of the transmitter, thereby enabling feedback channel resources to be effectively used.

Figure 13:
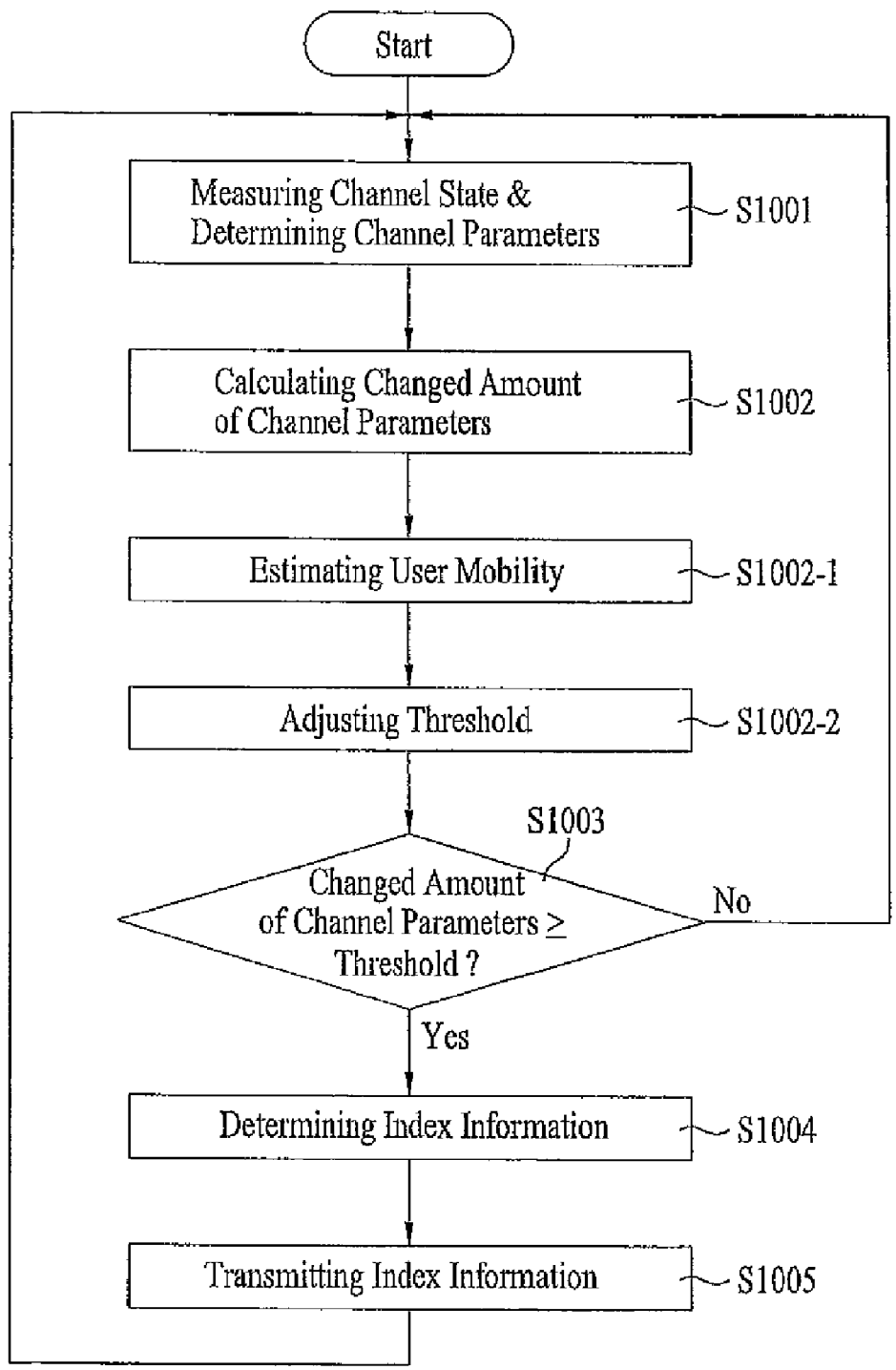
FIG. 13 is a flowchart of a feedback information transmission method according to one embodiment of the present invention.

One preferred embodiment of the present invention proposes a method of adjusting a threshold suitably according to user mobility to meet a target QoS maximumly. In the present embodiment, the former transmitter and receiver 800 and 900 of the aforesaid embodiment (hereinafter named 'basic embodiment for feedback adjustment') for adjusting the feedback according to the channel parameter variation are almost identically used. Yet, there exists a small difference in some configuration. A feedback transmitting method according to the present embodiment is explained in detail as follows. For reference, FIG. 13 is a flowchart of a feedback transmission method according to the present invention. The present embodiment includes the flowchart of the basic embodiment and further includes a step S1002-1 and a step S1002-2. So, the further included steps will be explained only as follows.

In the comparing module 952, it has been experimentally proved that a threshold needs to be suitably adjusted according to user mobility to implement maximum throughput at a trade-off point determined between a target QoS and a feedback information amount. In this case, the threshold is preferably set to a smaller value as the user mobility increases. And, the threshold is preferably set to a bigger value as the user mobility decreases.

Generally, a channel variation gets considerable as user mobility increases. So, it can be said that user mobility is proportional to a variation of channel parameter. Preferably, prior to deciding whether to execute feedback, the comparing module 952 estimates user mobility by calculating a variation of channel parameter (S1002-1) and then changes a current threshold into a suitable specific threshold by considering the estimated user mobility (S1002-2).

The comparing module 952 is able to change the current threshold using a threshold matching table including a channel parameter variation and a threshold matched to the channel parameter variation. Alternatively, the comparing module 952 is able to change the current threshold in a manner of inserting a current channel parameter variation in a prescribed proportion formula. In the following description, a process, in which the comparing module 952 calculates a variation of channel parameter using the channel parameter measured by the measuring module 951, for tracing user mobility using the calculated variation is explained.

First of all, an example of calculating a channel parameter variation using a channel parameter is shown in Formula 15. The present embodiment assumes that a channel power is used as a channel parameter.

$$|\bar{H}_n|^2 = |H_n|^2 + |\Xi_n|^2$$

$$|\Xi_n|^2 = (1-|\rho|^2)\sigma_h^2 \qquad \text{[Formula 15]}$$

In Formula 15, $|H_n|^2$ indicates an estimated channel power for an nth subcarrier, $|\Xi_n|^2$ indicates a variation of channel power according to user mobility, and $\sigma_h^2$ indicates an average energy of channel. And, 'ρ' is a variable found by inserting a Doppler frequency $f_d$ and a time delay $\tau_d$ in Bessel function $J_0$ in a time-varying channel environment. If user mobility increases, a value of 'ρ' decreases. If user mobility decreases, a value of 'ρ' increases. The 'ρ' can be found by $\rho = J_0(2\pi f_d \tau_d)$ explained for the embodiment of the channel quality estimation by considering the time delay. For reference, 'ρ=1' indicates a case that channel information is perfect.

After the variation of the channel power has been found by Formula 15, user mobility can be estimated using Formula 16.

$$f_d = f_c \times \frac{v}{c} \quad \text{[Formula 16]}$$

And, the measuring module 951 is able to measure a signal-to-noise ratio (SNR) more accurately by inserting the channel parameter variation calculated by Formula 15 in Formula 17 as follows.

$$SNR = \frac{1}{N}\sum_{n=1}^{N}(|\overline{H}_n|^2 E_s / \sigma_n^2) \quad \text{[Formula 17]}$$

$$= \frac{1}{N}\sum_{n=1}^{N}((|H_n|^2 + (1-|\rho|^2)\sigma_h^2)E_s / \sigma_n^2)$$

The feedback module 953 is able to calculate an MCS level index more accurately using the signal-to-noise ratio calculated by Formula 17 and can use the calculated MCS level index as a reference value for deciding an allocation scheme correctly. In the latter case, the parameter variation is calculated using the signal-to-noise ratio by Formula 17. If it is decided that the user mobility is large, the distributed scheme is selected. If it is decided that the user mobility is small, the localized scheme is selected.

A further embodiment of the present invention proposes a method of changing throughput in the transmitter 800 arbitrarily by adjusting feedback information amount to be transmitted by the receiver 900. In the present embodiment, the former transmitter and receiver 800 and 900 of the aforesaid embodiment for adjusting the feedback according to the channel parameter variation are almost identically used. Yet, there exists a small difference in some configuration.

Figure 14:
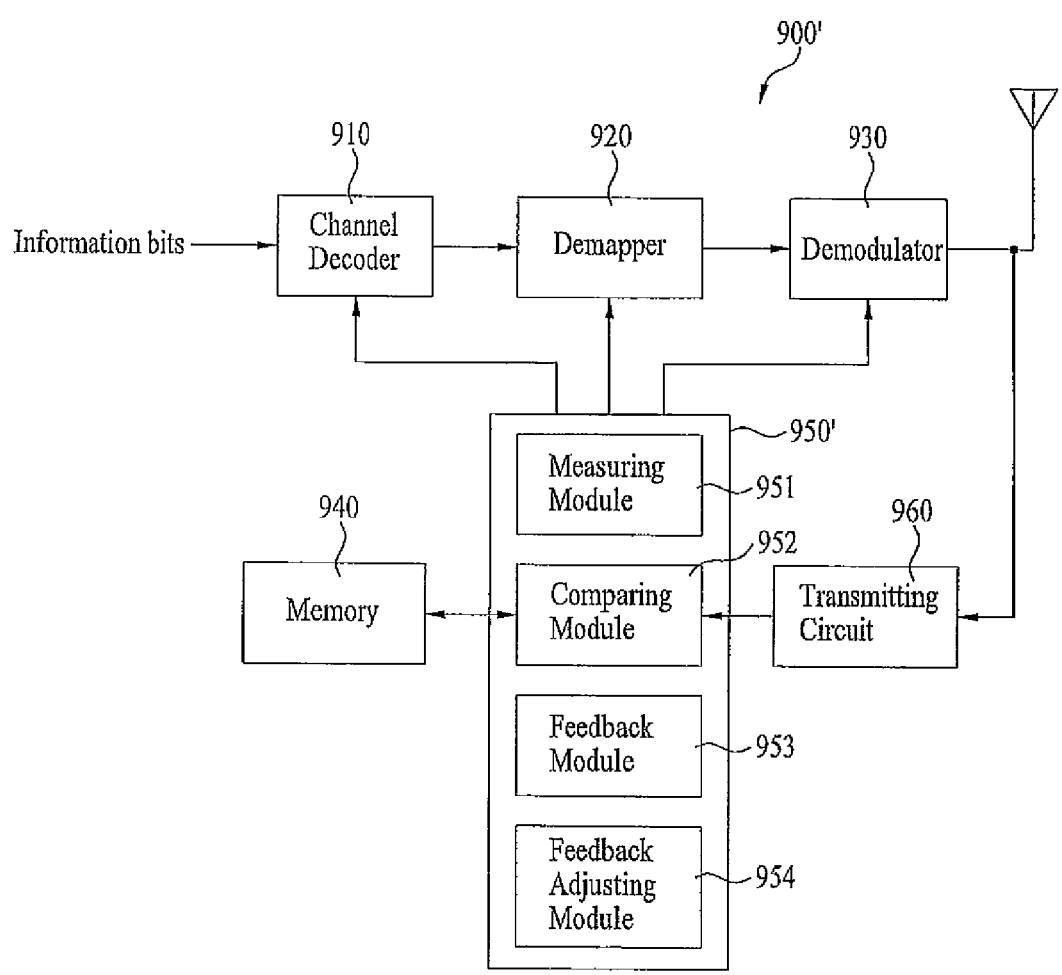
FIG. 14 is a block diagram of a receiver according to another embodiment of the present invention.

FIG. 14 is a block diagram of a receiver according to another embodiment of the present invention.

Referring to FIG. 14, a receiver according to another embodiment of the present invention further includes a feedback adjusting module for increasing or decreasing an amount of feedback information to be transmitted to the transmitter 800 in case of receiving a feedback transmission amount control signal. In this case, the feedback adjusting module 954 is included in a controller 950'. In this case, the feedback transmission amount control signal can be directly inputted from a user via an input unit (not shown in the drawing) or can be received from the transmitter 800.

Generally, if a feedback information amount increases, throughput in the transmitter 800 tends to increase. If a feedback information amount decreases, throughput in the transmitter 800 tends to decrease. So, in case that the feedback information amount is reduced to secure a resource of feedback channel, it is unable to avoid partial degradation of the throughput of the transmitter 800. If the feedback information amount is increased to prefer the throughput of the transmitter 800, partial occupancy of the feedback channel is inevitable.

The feedback adjusting module 954 can adjust the comparison period in the comparing module 952 to adjust the feedback information amount. In this case, if the comparison period increases, the feedback information amount may decrease. And, the feedback adjusting module 954 can adjust a threshold to adjust the feedback information amount. In this case, since the threshold is a reference value to decide whether to transmit the feedback information, if the threshold is raised, the feedback information amount is reduced. If the threshold is lowered, the feedback information amount is raised.

Figure 15:
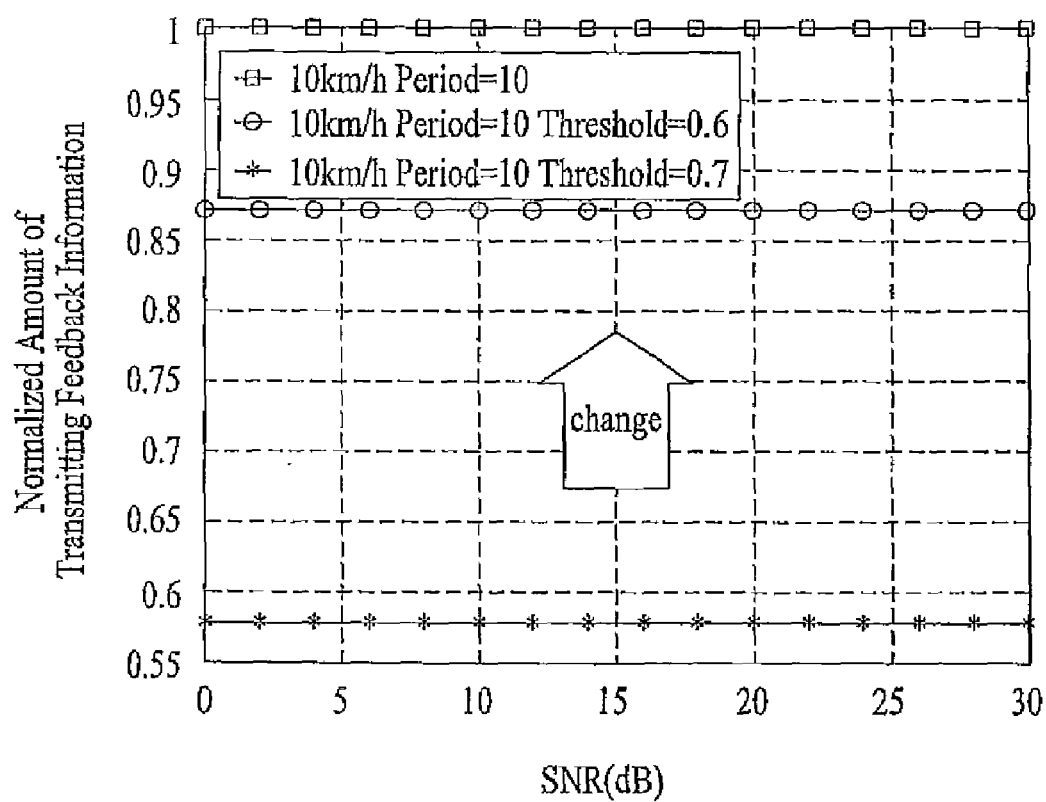
FIG. 15 is a graph for a case of adjusting an feedback information amount arbitrarily according to another embodiment of the present invention.
Figure 16:
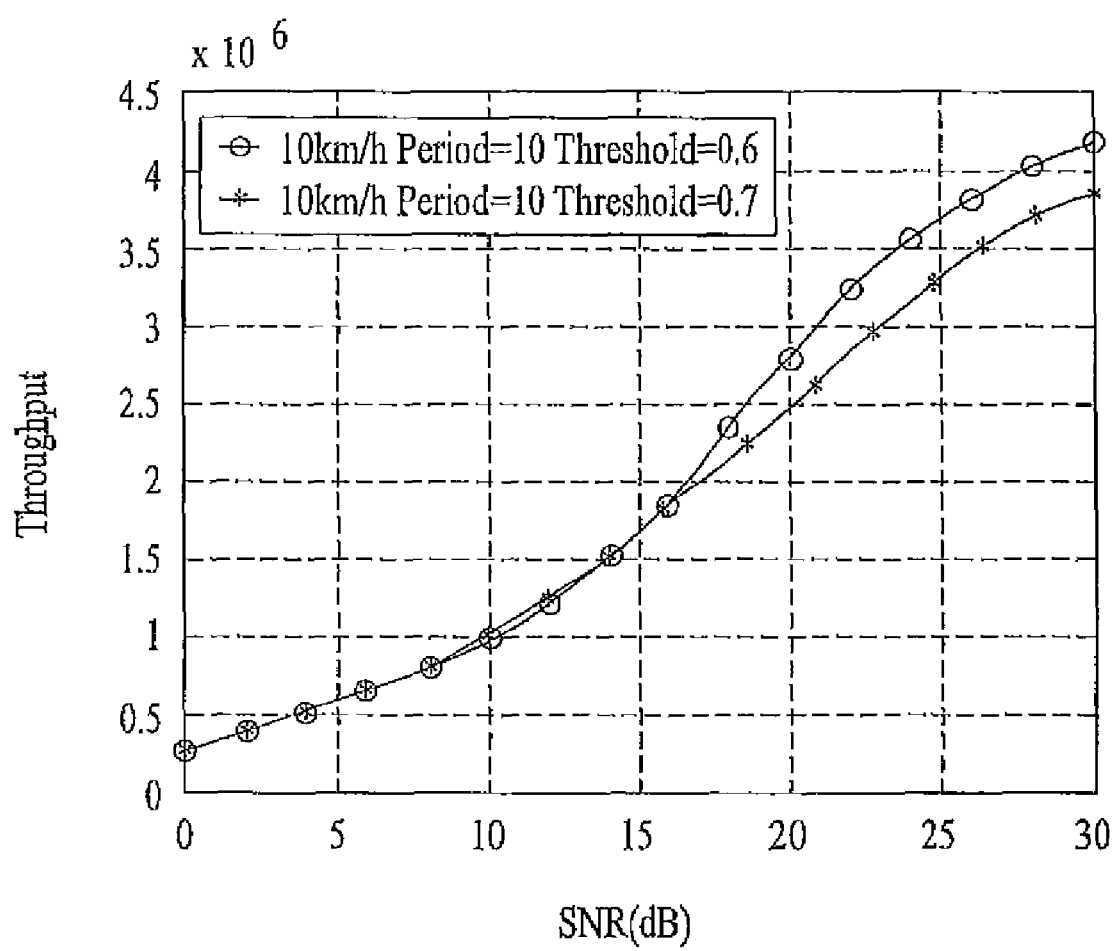
FIG. 16 is a graph of transmitter throughput comparison before and after feedback information amount adjustment.

FIG. 15 is a graph for a case of adjusting an feedback information amount arbitrarily according to another embodiment of the present invention and FIG. 16 is a graph of transmitter throughput comparison before and after feedback information amount adjustment. In FIG. 15 and FIG. 16, it is assumed that a user's moving speed and a feedback period are 10 km/h and 10 ms, respectively.

Referring to FIG. 15, if a value of normalizing a fed-back information amount in a related art communication system is 1, an information amount fed back in the communication system of the present invention becomes smaller than 1 as shown in the basic embodiment for the feedback adjustment. When a normalized feedback information amount in case of setting a threshold to 0.7 is about 0.59, it is assumed that a fed-back information amount is raised to amount 0.87 by setting the threshold to 0.6 to obtain more satisfactory QoS from the transmitter.

Referring to FIG. 16, as the feedback information amount is increased in FIG. 15, it can be observed that throughput in the transmitter varies in the vicinity of SNR 15 dB better than that of the previous case.

A further embodiment of the present invention proposes a method of decreasing a threshold in the receiver 900 to maintain a maximum throughput by increasing a fed-back information amount gradually in proportion to the increase of the user mobility, or increasing the threshold gradually in proportion to the decrease of the user mobility. In the present embodiment, the former transmitter and receiver 800 and 900 of the aforesaid embodiment for adjusting the feedback according to the channel parameter variation are almost identically used. Yet, there exists a small difference in some configuration.

Generally, if user mobility increases, a channel variation increases. So, a feedback information amount required for maintaining the same QoS increases. If user mobility decreases, a channel variation decreases. So, to maintain the same QoS, a right previous feedback information is usable intact. So, the required feedback information amount is reduced. Hence, the present embodiment mainly deals with adjusting the threshold in the transmitter 900 by considering user mobility.

In the present invention, the comparing module 953 of the receiver 900, which sends the feedback transmission control signal to the feedback module 953 if a channel parameter variation is greater than the threshold, is further provided with a function of increasing a subsequently fed-back information amount in a manner of decrementing the threshold by a prescribed unit if a current channel parameter variation is greater than a previous channel parameter variation.

If the current channel parameter variation is smaller than the previous channel parameter variation, the comparing module 953 gradually decreases a subsequently fed-back information amount in a manner of incrementing the threshold by a prescribed unit. The unit of the incremented or decremented threshold may be a value previously set in the receiver 200 or a value received from the transmitter 800.

Besides, the present invention can be implemented with hardware, software or combination thereof. In hardware implementation, the present invention can be implemented with one of ASIC (application specific integrated circuit), DSP (digital signal processing), PLD (programmable logic device), FPGA (field programmable gate array), processor, controller, microprocessor, other electronic units, and combination thereof, which are designed to perform the aforesaid functions. In software implementation, the present invention can be implemented with a module for performing the aforesaid functions. Software is storable in a memory unit and executed by a processor. Various means widely known to those skilled in the art can be used as the memory unit or the processor.

INDUSTRIAL APPLICABILITY

Accordingly, first of all, the present invention compensates for a time delay of a channel due to user mobility, thereby enhancing performance of a system. And, the present invention reduces a difference between an actual channel quality and an estimated channel quality due to a time delay in a channel environment having user mobility. Hence, the present invention determines an optimal MCS level and prevents performance of AMC scheme from being degraded.

Secondly, the present invention performs feedback transmission only if predetermined conditions are met. So, the present invention saves a resource of a feedback channel while a data rate of a transmitting end almost remains intact. And, the present invention is able to change a feedback condition by considering user mobility, thereby implementing an optimal data rate from the transmitting end.

Therefore, the present invention provides an enhanced AMC scheme of which performance degradation caused by inaccuracy of channel quality information and unnecessary feedback transmission in an environment having user mobility can be prevented.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An adaptive modulation and coding method, in which adaptive modulation and coding (AMC) is applied in a channel environment considering user mobility, the adaptive modulation and coding method comprising:
    measuring a first channel parameter and a second channel parameter using first and second symbols sequentially received, respectively;
    estimating a channel quality considering a time delay between measurements of the first and second channel parameters using the first and second channel parameters; and
    transmitting information for the estimated channel quality if a variation of channel parameter between the first and second channel parameters is equal to or greater than a prescribed threshold,
    wherein the first and second channel parameters are averages of per subcarrier signal-to-noise ratios of the first and second symbols received via at least one or more subcarriers, respectively,
    wherein the channel quality considering the time delay is estimated by a formula of $$SNR = \frac{1}{N}\sum_{n=1}^{N}Q\left(\frac{|H_n^k|^2 + |H_n^{k-1}|^2}{2}\frac{E_s}{\sigma_n^2}\right) \text{ or}$$

$$SNR = \frac{1}{N}\sum_{n=1}^{N}Q\left(\left(\frac{|H_n^k|^2 + |H_n^{k-1}|^2}{2} + (1-|\rho|^2)\sigma_h^2\right)\left(\frac{E_s}{\sigma_n^2}\right)\right),$$

where the N is the number of the subcarriers (N>1), the $E_s$ is an average signal energy, the $\sigma_n^2$ is a noise energy, the $H_n^k$ is the second channel parameter of an nth subcarrier at a symbol k, and the $H_n^{k-1}$ is the first channel parameter of the nth subcarrier at a symbol k−1, and where the $\sigma_h^2$ is an average energy of channel and the p is a parameter calculated using Bessel function by considering a Doppler frequency and the time delay.

2. The adaptive modulation and coding method of, claim 1, wherein the channel quality considering the time delay is estimated by considering channel perturbation variation.

3. The adaptive modulation and coding method of claim 1, further comprising adjusting the threshold according to the variation.

4. The adaptive modulation and coding method of claim 3, wherein the adjusting the threshold is carried out in a manner of decrementing the threshold if the variation increases or incrementing the threshold if the variation decreases.

5. A method of estimating a signal-to-noise ratio, the method comprising:
    finding first channel information for subcarriers by receiving first signals carried by the subcarriers;
    finding second channel information for the subcarriers by receiving second signals carried by the subcarriers after finding the first channel information; and
    estimating the signal-to-noise ratio (SNR) of a channel by considering a time delay between the first and second channel informations using the first and second channel informations,
    wherein the signal-to-noise ratio is estimated by a formula of $$SNR = \frac{1}{N}\sum_{n=1}^{N}Q\left(\frac{|H_n^k|^2 + |H_n^{k-1}|^2}{2}\frac{E_s}{\sigma_n^2}\right) \text{ or}$$

$$SNR = \frac{1}{N}\sum_{n=1}^{N}Q\left(\left(\frac{|H_n^k|^2 + |H_n^{k-1}|^2}{2} + (1-|\rho|^2)\sigma_h^2\right)\left(\frac{E_s}{\sigma_n^2}\right)\right),$$

where the N is the number of the subcarriers (N>1), the $E_s$ is an average signal energy, the $\sigma_n^2$ is a noise energy, the $H_n^k$ is the second channel information for an nth subcarrier at a symbol k, and the $H_n^{k-1}$ is the first channel information for the nth subcarrier at a symbol k−1, and the $\sigma_h^2$ is an average energy of channel and the p is a parameter calculated using Bessel function by considering a Doppler frequency and the time delay.

6. The method of claim 5, wherein the subcarriers are plural and wherein the signal-to-noise ratio corresponds to an average of the signal-to-noise ratios of a plurality of the subcarriers.

7. The method of claim 6, wherein the first channel information is an average of channel information for the plurality of the subcarriers.

8. The method of claim 5, wherein the signal-to-noise ration-ratio is estimated by considering channel perturbation variation.

9. An adaptive modulation and coding method, in which modulation and coding schemes are adaptively decided according to a channel quality, the adaptive modulation and coding method comprising:

receiving a symbol;

estimating the channel quality by considering a time delay of a channel for transmitting the symbol using channel information estimated by using the symbol; and deciding modulation and coding schemes of the symbol using the estimated channel quality, wherein the channel quality considering the time delay is estimated by a formula of $$SNR = \frac{1}{N} \sum_{n=1}^{N} Q\left(\frac{|H_n^k|^2 + |H_n^{k-1}|^2}{2} \frac{E_s}{\sigma_n^2}\right) \text{ or}$$

$$SNR = \frac{1}{N} \sum_{n=1}^{N} Q\left(\left(\frac{|H_n^k|^2 + |H_n^{k-1}|^2}{2} + (1-|\rho|^2)\sigma_h^2\right)\left(\frac{E_s}{\sigma_n^2}\right)\right),$$

where the N is the number of the subcarriers (N>1), the $E_s$ is an average signal energy, the $\sigma_n^2$ is a noise energy, the $H_n^k$ is a second channel parameter of an nth subcarrier at a symbol k, and the $H_n^{k-1}$ is a first channel parameter of the nth subcarrier at a symbol k−1, and the $\sigma_h^2$ is an average energy of channel and the p is a parameter calculated using Bessel function by considering a Doppler frequency and the time delay.

10. The adaptive modulation and coding method of claim 9, wherein the channel quality is a signal-to-noise ratio.

11. The adaptive modulation and coding method of claim 9, wherein the channel quality is found using current channel information and previous channel information.

12. A receiver comprising:

a channel estimator finding channel information using symbols received via an antenna;

a channel quality estimator estimating a channel quality by considering a time delay of a channel for transmitting the symbols using the channel information; and a controller deciding modulation and coding schemes according to the channel quality, wherein the channel quality considering the time delay is estimated by a formula of $$SNR = \frac{1}{N} \sum_{n=1}^{N} Q\left(\frac{|H_n^k|^2 + |H_n^{k-1}|^2}{2} \frac{E_s}{\sigma_n^2}\right) \text{ or}$$

$$SNR = \frac{1}{N} \sum_{n=1}^{N} Q\left(\left(\frac{|H_n^k|^2 + |H_n^{k-1}|^2}{2} + (1-|\rho|^2)\sigma_h^2\right)\frac{E_s}{\sigma_n^2}\right),$$

where the N is the number of the subcarriers (N>1), the $E_s$ is an average signal energy, the $\sigma_n^2$ is a noise energy, the $H_n^k$ is a second channel parameter of an nth subcarrier at a symbol k, and the $H_n^{k-1}$ is a first channel parameter of the nth subcarrier at a symbol k−1, and the $\sigma_h^2$ is an average energy of channel and the p is a parameter calculated using Bessel function by considering a Doppler frequency and the time delay.

13. An adaptive feedback information adjusting method, in which a feedback information amount is adaptively adjusted by a receiving end of a communication system, the adaptive feedback information adjusting method comprising:

determining a channel parameter by measuring a channel status;

calculating a channel parameter variation using the determined channel parameter and a previously determined channel parameter; and if the channel parameter variation is greater than a preset threshold, transmitting prescribed feedback information to a transmitting end, wherein the channel status considering the channel parameter variation is estimated by a formula of $$SNR = \frac{1}{N} \sum_{n=1}^{N} Q\left(\frac{|H_n^k|^2 + |H_n^{k-1}|^2}{2} \frac{E_s}{\sigma_n^2}\right) \text{ or}$$

$$SNR = \frac{1}{N} \sum_{n=1}^{N} Q\left(\left(\frac{|H_n^k|^2 + |H_n^{k-1}|^2}{2} + (1-|\rho|^2)\sigma_h^2\right)\left(\frac{E_s}{\sigma_n^2}\right)\right),$$

where the N is the number of the subcarriers (N>1), the $E_s$ is an average signal energy, the $\sigma_n^2$ is a noise energy, the $H_n^k$ is the determined channel parameter of an nth subcarrier at a symbol k, and the $H_n^{k-1}$ is the previously determined channel parameter of the nth subcarrier at a symbol k−1, and the $\sigma_h^2$ is an average energy of channel and the p is a parameter calculated using Bessel function by considering a Doppler frequency and the time delay.

14. The adaptive feedback information adjusting method of claim 13, further comprising adjusting the threshold by considering the channel parameter variation.

15. The adaptive feedback information adjusting method of claim 14, wherein the adjusting the threshold is carried out in a manner of decrementing the threshold if the channel parameter variation increases or incrementing the threshold if the channel parameter variation decreases.

16. The adaptive feedback information adjusting method of claim 13, further comprising adjusting the feedback information amount by changing the preset threshold into a specific threshold.

17. The adaptive feedback information adjusting method of claim 13, wherein the channel status is a power of a corresponding channel.

18. The adaptive feedback information adjusting method of claim 13, wherein the channel status is a signal-to-noise ratio of a corresponding channel.

19. The adaptive feedback information adjusting method of claim 13, wherein the feedback information designates at least one of a modulation scheme and a coding rate.

20. A transceiver in a communication system, the transceiver adjusting a feedback information amount in the communication system, the transceiver comprising:

a measuring module determining a channel parameter by measuring a channel status;

a comparing module calculating a channel parameter variation using the determined channel parameter and a previously determined channel parameter, the comparing module, if the channel parameter variation is greater than a preset threshold, transmitting a feedback transmission control signal; and a feedback module transmitting prescribed feedback information if the feedback transmission control signal is received wherein the channel status considering the channel parameter variation is estimated by a formula of $$SNR = \frac{1}{N} \sum_{n=1}^{N} Q\left( \frac{|H_n^k|^2 + |H_n^{k-1}|^2}{2} \frac{E_s}{\sigma_n^2} \right) \text{ or}$$

$$SNR = \frac{1}{N} \sum_{n=1}^{N} Q\left( \left( \frac{|H_n^k|^2 + |H_n^{k-1}|^2}{2} + (1-|\rho|^2)\sigma_h^2 \right)\left(\frac{E_s}{\sigma_n^2}\right) \right),$$

where the N is the number of the subcarriers (N>1), the $E_s$ is an average signal energy, the $\sigma_n^2$ is a noise energy, the $H_n^k$ the determined channel parameter of an nth subcarrier at a symbol k, and the $H_n^{k-1}$ is the previously determined channel parameter of the nth subcarrier at a symbol k−1, and the $\sigma_h^2$ is an average energy of channel and the p is a parameter calculated using Bessel function by considering a Doppler frequency and the time delay.

21. The transceiver of claim 20, wherein the comparing module adjusts the threshold by considering the calculated channel parameter variation.

22. The transceiver of claim 21, wherein the comparing module adjusts the threshold in a manner of gradually decrementing the threshold if the channel parameter variation increases or gradually incrementing the threshold if the channel parameter variation decreases.

23. The transceiver of claim 20, further comprising a feedback adjusting module adjusting a feedback information amount by changing the preset threshold into a specific threshold.

24. The transceiver of claim 20, wherein the feedback information designates at least one selected from the group consisting of a modulation scheme and a coding rate.

* * * * *